(12) United States Patent
Xie

(10) Patent No.: US 9,923,511 B2
(45) Date of Patent: Mar. 20, 2018

(54) CONNECTING SOLAR MODULES

(71) Applicant: Jason Sen Xie, Fremont, CA (US)

(72) Inventor: Jason Sen Xie, Fremont, CA (US)

( * ) Notice: Subject to any disclaimer, the term of this patent is extended or adjusted under 35 U.S.C. 154(b) by 30 days.

(21) Appl. No.: 15/162,156

(22) Filed: May 23, 2016

(65) Prior Publication Data

US 2017/0040934 A1 Feb. 9, 2017

Related U.S. Application Data

(60) Provisional application No. 62/200,521, filed on Aug. 3, 2015, provisional application No. 62/272,092, filed on Dec. 29, 2015.

(51) Int. Cl.
*H02S 30/10* (2014.01)
*H02S 20/23* (2014.01)
*H01R 4/64* (2006.01)

(52) U.S. Cl.
CPC .............. *H02S 30/10* (2014.12); *H02S 20/23* (2014.12); *H01R 4/64* (2013.01)

(58) Field of Classification Search
CPC . H01R 4/64; H02S 20/23; H02S 30/10; Y02E 10/47; Y02B 10/12
See application file for complete search history.

(56) References Cited

U.S. PATENT DOCUMENTS

| | | | | |
|---|---|---|---|---|
| 6,959,517 B2* | 11/2005 | Poddany | ............... | E06B 1/6015 52/173.3 |
| 7,774,998 B2* | 8/2010 | Aschenbrenner | ...... | F24J 2/5211 136/244 |
| 7,987,641 B2 | 8/2011 | Cinnamon | | |
| 8,191,321 B2* | 6/2012 | McClellan | .......... | E04D 13/0445 126/623 |
| 8,344,239 B2* | 1/2013 | Plaisted | ................. | F24J 2/5207 136/251 |
| 8,453,986 B2* | 6/2013 | Schnitzer | ............... | F24J 2/5203 126/623 |
| 8,495,839 B2* | 7/2013 | Tsuzuki | ................. | F24J 2/4614 136/244 |
| 8,544,223 B1* | 10/2013 | Konstantin | ............... | E04D 3/28 52/204.591 |
| 8,683,761 B2* | 4/2014 | Danning | ................. | H02S 20/23 136/251 |
| 8,695,290 B1* | 4/2014 | Kim | ...................... | F24J 2/5252 248/225.11 |
| 8,713,858 B1* | 5/2014 | Xie | ........................ | E04D 13/147 52/58 |
| 8,713,881 B2* | 5/2014 | DuPont | .................. | F24J 2/5203 52/173.3 |
| 8,763,978 B2* | 7/2014 | Newman | ................ | F24J 2/5205 248/424 |
| 8,806,815 B1* | 8/2014 | Liu | ..................... | H01L 31/0422 248/295.11 |

(Continued)

*Primary Examiner* — James M Ference

(74) *Attorney, Agent, or Firm* — Douglas L Weller

(57) ABSTRACT

A solar module connector connects a first solar module to a second solar module. A solar module connector top part includes a slot insert that fits within a frame slot of a first solar module frame of the first solar module. A solar module connector bottom part includes a slot insert that fits within a frame slot of a second solar module frame of the second solar module. A fastener securely fastens the solar module connector top part to the solar module connector bottom.

15 Claims, 32 Drawing Sheets

(56) References Cited

U.S. PATENT DOCUMENTS

| | | | | |
|---|---|---|---|---|
| 8,813,460 B2* | 8/2014 | Cinnamon | F24J 2/5211 | 136/244 |
| 8,839,573 B2* | 9/2014 | Cusson | F24J 2/5232 | 248/231.81 |
| 8,839,575 B1* | 9/2014 | Liu | H01L 31/0422 | 248/295.11 |
| 8,869,470 B2* | 10/2014 | Lanza | E04D 13/1687 | 285/42 |
| 8,919,052 B2* | 12/2014 | West | F24J 2/5211 | 52/173.3 |
| 8,919,053 B2 | 12/2014 | West | | |
| 8,938,919 B2* | 1/2015 | Cinnamon | H02S 40/36 | 136/244 |
| 8,984,751 B2* | 3/2015 | Ramos | F24J 2/5205 | 29/525.01 |
| 8,991,114 B2 | 3/2015 | West | | |
| 9,175,881 B2* | 11/2015 | Schrock | F16B 9/023 | |
| 9,194,613 B2* | 11/2015 | Nuernberger | H02S 20/00 | |
| 9,231,518 B2 | 1/2016 | Cinnamon et al. | | |
| 9,243,817 B2 | 1/2016 | West et al. | | |
| 9,291,369 B2* | 3/2016 | West | F24J 2/5211 | |
| 9,300,244 B2 | 3/2016 | West et al. | | |
| 9,647,433 B2* | 5/2017 | Meine | H02S 40/36 | |
| 2003/0015637 A1* | 1/2003 | Liebendorfer | F24J 2/5205 | 248/237 |
| 2003/0094193 A1* | 5/2003 | Mapes | F24J 2/5207 | 136/244 |
| 2003/0201009 A1* | 10/2003 | Nakajima | F24J 2/5207 | 136/251 |
| 2004/0000334 A1* | 1/2004 | Ressler | F24J 2/5211 | 136/251 |
| 2004/0154655 A1* | 8/2004 | Tanaka | F24J 2/4614 | 136/244 |
| 2004/0187909 A1* | 9/2004 | Sato | F24J 2/4614 | 136/251 |
| 2005/0257453 A1* | 11/2005 | Cinnamon | F24J 2/5211 | 52/173.3 |
| 2006/0118163 A1* | 6/2006 | Plaisted | F24J 2/5207 | 136/251 |
| 2006/0156648 A1* | 7/2006 | Thompson | F24J 2/5245 | 52/173.3 |
| 2007/0251567 A1* | 11/2007 | Plaisted | F24J 2/045 | 136/244 |
| 2008/0053009 A1* | 3/2008 | Plaisted | F24J 2/4614 | 52/173.3 |
| 2008/0053517 A1* | 3/2008 | Plaisted | F24J 2/5207 | 136/251 |
| 2008/0087275 A1* | 4/2008 | Sade | F24J 2/5235 | 126/623 |
| 2008/0121273 A1* | 5/2008 | Plaisted | F16L 3/127 | 136/251 |
| 2008/0169018 A1* | 7/2008 | Miyamoto | F24J 2/5207 | 136/251 |
| 2009/0019796 A1* | 1/2009 | Liebendorfer | F24J 2/5207 | 52/173.3 |
| 2009/0025314 A1* | 1/2009 | Komamine | F24J 2/5207 | 52/173.3 |
| 2009/0165843 A1* | 7/2009 | Horioka | H02S 30/10 | 136/251 |
| 2010/0018571 A1* | 1/2010 | Placer | F24J 2/4647 | 136/251 |
| 2010/0065108 A1* | 3/2010 | West | F24J 2/5211 | 136/251 |
| 2010/0088996 A1* | 4/2010 | Thompson | F24J 2/5245 | 52/704 |
| 2010/0154784 A1* | 6/2010 | King | F24J 2/464 | 126/623 |
| 2010/0276558 A1* | 11/2010 | Faust | F24J 2/5205 | 248/222.14 |
| 2011/0070765 A1* | 3/2011 | Kobayashi | F24J 2/5207 | 439/387 |
| 2011/0094170 A1* | 4/2011 | Kalkanoglu | H01L 31/02008 | 52/173.3 |
| 2011/0100433 A1* | 5/2011 | Jonczyk | F24J 2/5232 | 136/251 |
| 2011/0179727 A1* | 7/2011 | Liu | F24J 2/5203 | 52/173.3 |
| 2011/0239554 A1* | 10/2011 | Tsuzuki | F24J 2/045 | 52/173.3 |
| 2011/0247279 A1* | 10/2011 | Stearns | E04D 13/10 | 52/58 |
| 2012/0023843 A1* | 2/2012 | Stearns | E04D 13/10 | 52/173.3 |
| 2012/0073220 A1* | 3/2012 | Kobayashi | E04D 1/30 | 52/173.3 |
| 2012/0102854 A1* | 5/2012 | Meier | F24J 2/5205 | 52/173.3 |
| 2012/0125410 A1* | 5/2012 | West | F24J 2/5211 | 136/251 |
| 2012/0298188 A1* | 11/2012 | West | F24J 2/5211 | 136/251 |
| 2012/0298817 A1* | 11/2012 | West | F24J 2/5211 | 248/220.22 |
| 2013/0014809 A1* | 1/2013 | Sagayama | F24J 2/5205 | 136/251 |
| 2013/0091786 A1* | 4/2013 | DuPont | F24J 2/5249 | 52/173.3 |
| 2013/0102165 A1* | 4/2013 | DuPont | F24J 2/4607 | 439/95 |
| 2013/0212959 A1* | 8/2013 | Lopez | H01L 31/0422 | 52/173.3 |
| 2014/0150251 A1* | 6/2014 | Erickson | F24J 2/461 | 29/825 |
| 2014/0151312 A1* | 6/2014 | Cusson | F24J 2/5207 | 211/41.1 |
| 2014/0175244 A1* | 6/2014 | West | F24J 2/5205 | 248/316.7 |
| 2014/0220834 A1* | 8/2014 | Rizzo | H01L 31/042 | 439/834 |
| 2014/0329420 A1* | 11/2014 | Magno | H01R 11/26 | 439/803 |
| 2014/0339179 A1* | 11/2014 | West | F24J 2/5211 | 211/41.1 |
| 2015/0034362 A1* | 2/2015 | Kovalov | H01R 27/02 | 174/126.1 |
| 2015/0101997 A1* | 4/2015 | Liu | F24J 2/5258 | 211/41.1 |
| 2015/0107168 A1* | 4/2015 | Kobayashi | F24J 2/5245 | 52/173.3 |
| 2015/0107651 A1* | 4/2015 | Cinnamon | H02S 40/36 | 136/251 |
| 2015/0280638 A1* | 10/2015 | Stephan | H02S 20/23 | 52/173.3 |
| 2016/0006390 A1* | 1/2016 | Cinnamon | H02S 20/23 | 248/237 |
| 2016/0043687 A1 | 2/2016 | McPheeters et al. | | |
| 2016/0043689 A1* | 2/2016 | McPheeters | F24J 2/5245 | 248/231.31 |
| 2016/0087578 A1 | 3/2016 | Cinnamon et al. | | |
| 2017/0040934 A1* | 2/2017 | Xie | H02S 30/10 | |

* cited by examiner

CONNECTING SOLAR MODULES

BACKGROUND

Solar modules, such as solar photovoltaic solar modules and solar thermal solar modules, are often installed on the ground, on a roof or on other structures. It is common to install the solar modules using a pair of rails secured to a rooftop or other structure. For example, solar modules are secured to rails with clamps. The long rails required for such solar modules can increase installation cost due to transportation and material cost. Further, in such systems clamps of various sizes are required to accommodate solar modules with different frame thickness. Additional mounting and securing methods include rail-less or rail-free solar mounting methods, where clamps are used to secure solar modules to each other and to a roof.

DESCRIPTION OF THE EMBODIMENTS

Figure 1:
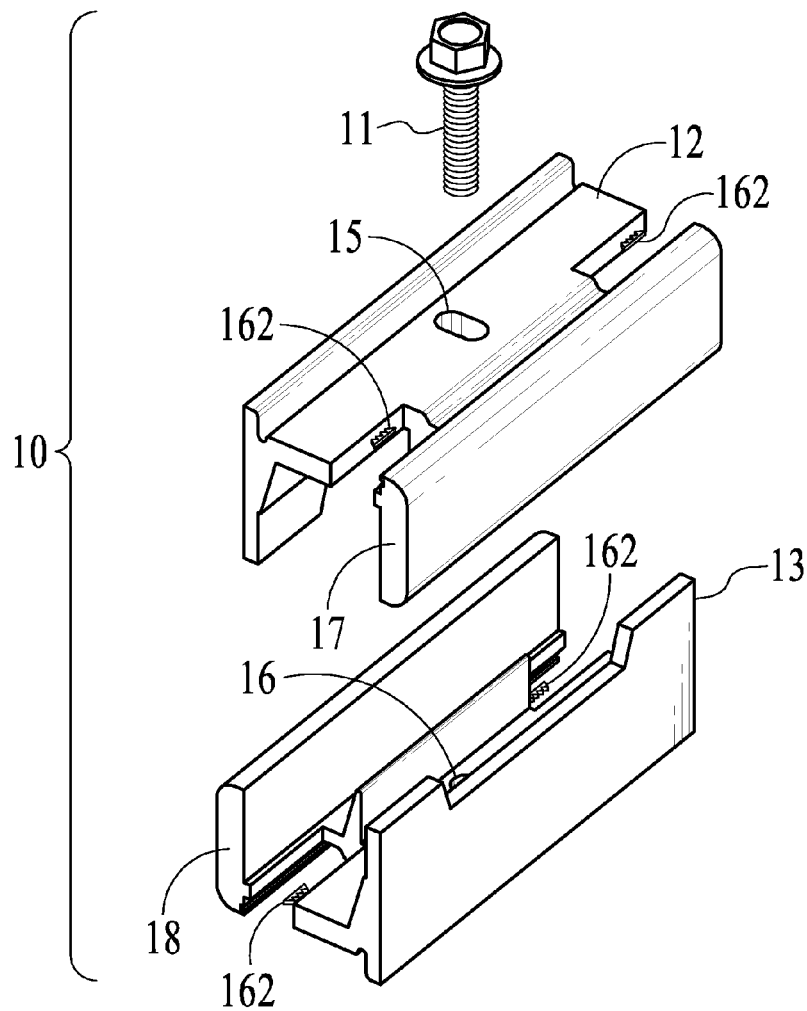
FIG. 1, FIG. 2, FIG. 3 and FIG. 4 provide various views of a solar module connector in accordance with an implementation.
Figure 2:
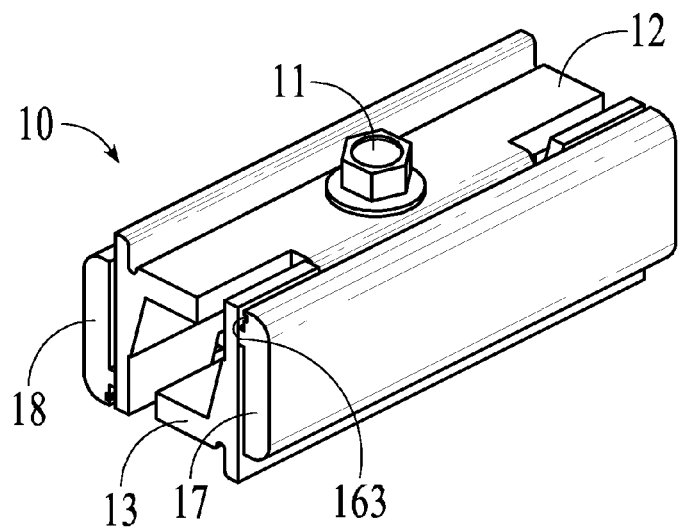

Solar modules are connected to each other and installed on a sloped rooftop, a commercial building rooftop, ground or other structures.

A solar module aluminum frame includes a slot along a vertical outside of the solar module so that a solar module connector can slide into the slot and a T-bolt of a roof attachment can snap into the slot. While in the description below, a T-bolt is used to slide into the slot, any shaped bolt can be used provided the head is shaped to slide into the slot on a solar module frame.

For example, two types of solar module connectors are described herein: an interlocking solar module connector and a clamping solar module connector. An interlocking solar module connector structurally connects two solar modules even if they are slightly not leveled. When solar modules are connected with interlocking solar module connectors, it may be difficult to remove the solar module for replacement or service when the solar module is surrounded by other solar modules in a solar array. Clamping solar module connectors can structurally connect two solar modules; however, if two solar modules are not leveled, it may be difficult to securely connect them with such clamping solar module connectors. However, if solar modules are connected with clamping solar module connectors as described herein, the solar module can easily be removed for replacement or service even when the solar module is surrounded by other solar modules in a solar array.

A solar module connector, whether an interlocking solar module connector or a clamping solar module connector, has a solar module connector top part and a solar module connector bottom part. One end of each part is connected to one solar module by sliding into a solar module slot. The solar module connector top part goes down to the solar module connector bottom part and they interlock with each other. A fastener, such as a bolt, tightens the solar module connector top part to the solar module connector bottom part so that two solar modules are pulled together and against the interlocking solar module connector. This connects the two solar modules structurally and also bonds the two solar modules electrically. While in the following descriptions, bolts are used as a fastener, other types of fasteners may be used as long as the fasteners provide sufficient pressure to hold the two solar modules together and to provide sufficient electrical connections.

A roof attachment has a top part, for example, an L-bracket. Herein, what is mean by an "L-bracket" is a bracket that has holes or slots for attachment on two-different substantially orthogonal planes. The L-bracket can be shaped like an "L" or can have another shape (such as a "T") provided the bracket that has holes for attachment on two-different substantially orthogonal planes.

A bottom part of the roof attachment is a base with different designs for different types of roofs. A top part L-bracket can be secured through a bolt or bolts to the bottom part. The base of a roof attachment can be secured to a roof at an estimated position where the solar module is.

The position of the top part can be adjusted horizontally backward and forward to accommodate the precise position of the solar module. A vertical slot on the roof attachment can adjust the height of the solar module precisely. Horizontal and vertical adjustments can be performed when a solar module is secured to a roof through roof attachments.

FIG. 1, FIG. 2, FIG. 3 and FIG. 4 provide various views of an interlocking solar module connector 10. A bolt 11 goes through a slot 15 on an interlocking solar module connector top part 12 and into a threaded hole 16 of an interlocking solar module connector bottom part 13. When bolt 11 is tightened into threaded hole 16, interlocking solar module connector top part 12 and interlocking solar module connector bottom part 13 are pulled together horizontally and vertically. When interlocking solar modules, a slot insert 17 of interlocking solar module connector top part 12 is placed within a frame slot of a first solar module and a slot insert 18 of interlocking solar module connector bottom part 13 is placed within a frame slot of a second solar module. When interlocking solar module connector top part 12 and interlocking solar module connector bottom part 13 are pulled together horizontally and vertically, this locks the first solar module to the second solar module.

Figure 3:
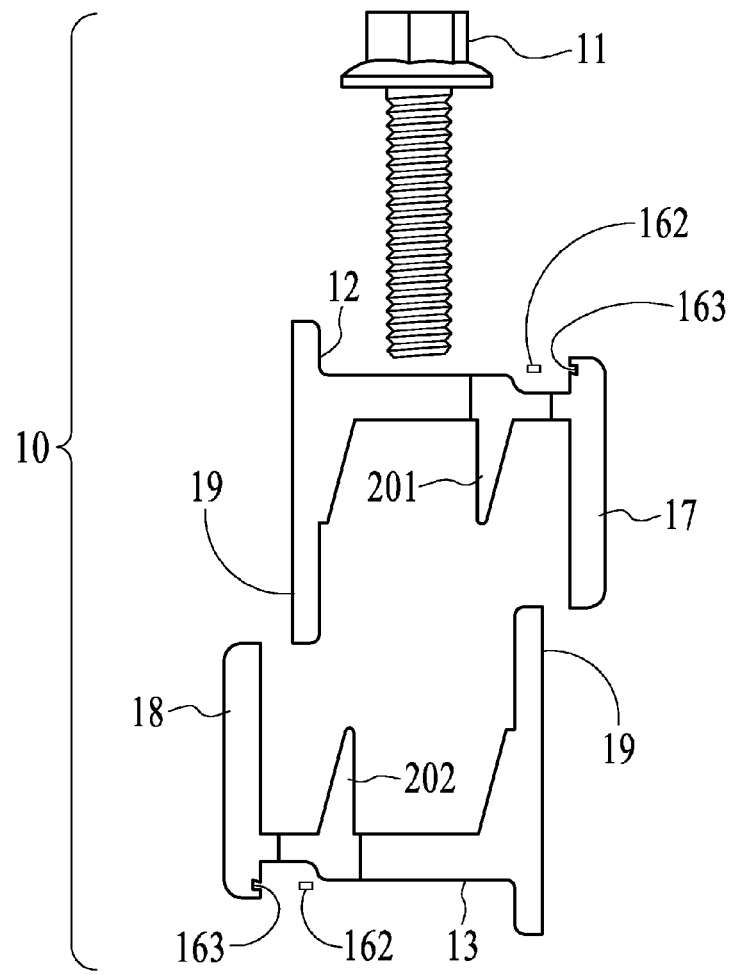
Figure 4:
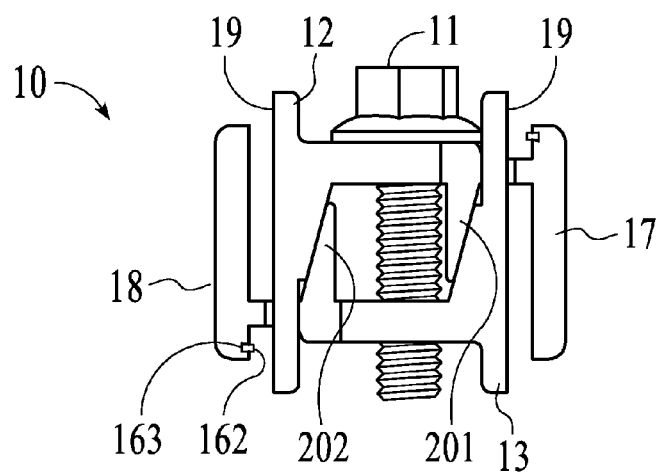
Figure 5:
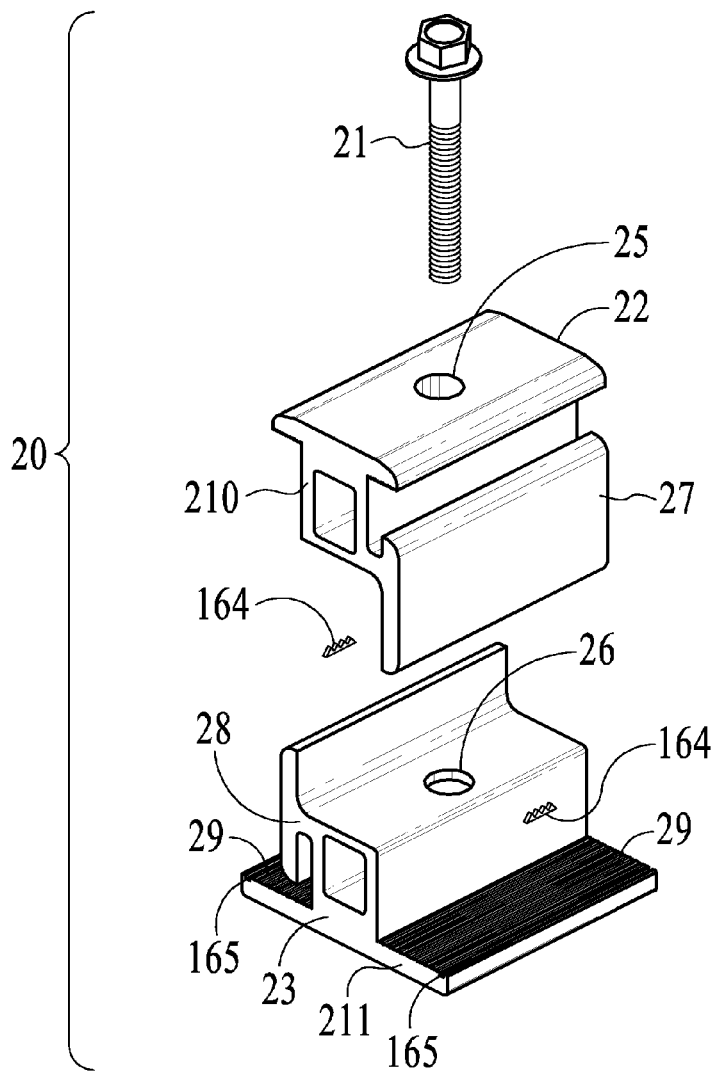
FIG. 5, FIG. 6, FIG. 7 and FIG. 8 provide various views of another solar module connector before assembly and after assembly, in accordance with an implementation.
Figure 6:
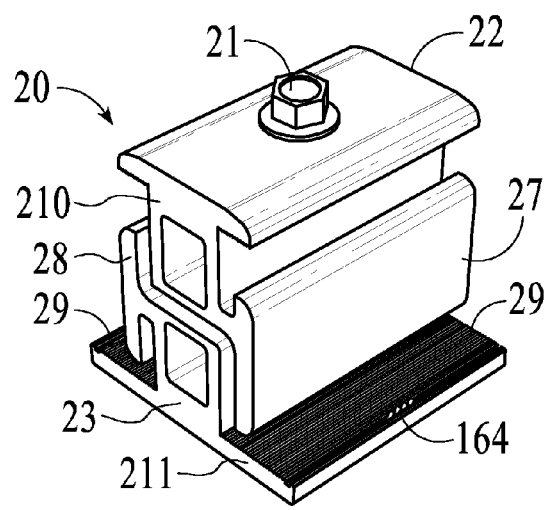
Figure 7:
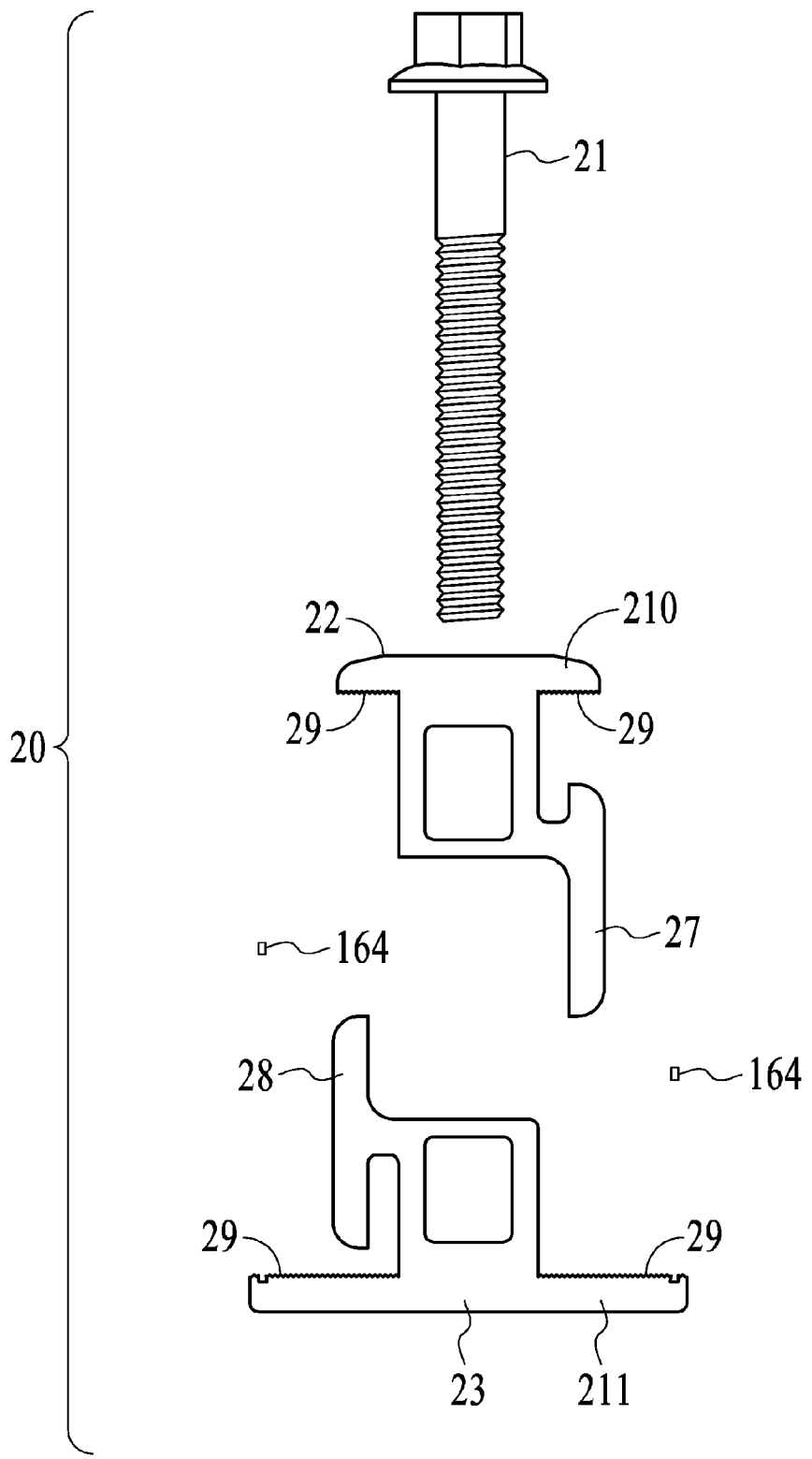
Figure 8:
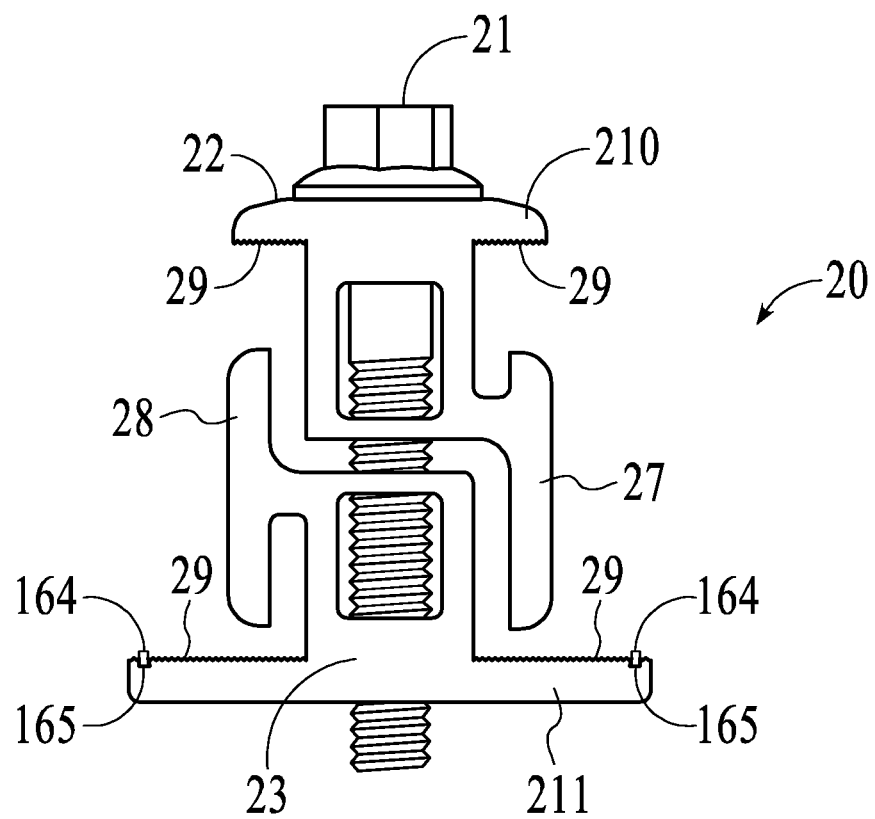

As seen from FIG. 3 and FIG. 4, angled guide 201 of interlocking solar module connector top part 12 and angled guide 202 of interlocking solar module connector bottom part 13 force horizontal motion as bolt 11 is tightened. This horizontal motion presses bonding teeth 19 on interlocking solar module connector top part 12 into the second solar module and creates an electrical connection between interlocking solar module connector top part 12 and the second solar module. This horizontal motion also presses bonding teeth 19 on interlocking solar module connector bottom part 13 into the first solar module and creates an electrical connection between interlocking solar module connector bottom part 13 and the first solar module. These electrical connections result in an electrical connection between the first solar module and the second solar module.

Figure 45:
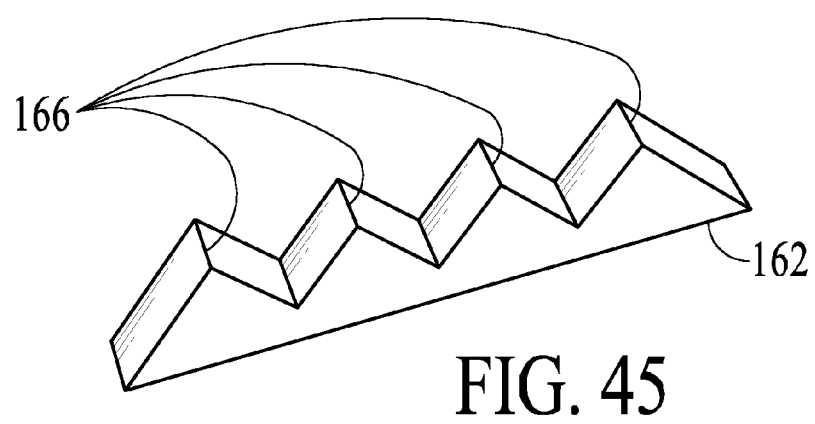
FIG. 45 shows a bonding pin in accordance with an implementation.

Bonding pins 162 are placed within slots 163 of module connector top part 12 and module connector bottom part 13. For example, each of bonding pins 162 is a stainless steel strip. A close-up of one of bonding pins 162 is shown in FIG. 45. Bonding pins 162 have sharp teeth 166. Bonding pins 162 are inserted into slots 163 with sharp teeth 166 facing outward. The edges of interlocking solar module connector 10 near each of bonding pins 162 is pressed with force so bonding pins 162 will be secured inside slot 163. Interlocking solar module connector 10 may have two, three, four or any number of bonding pins 163.

FIG. 5, FIG. 6, FIG. 7 and FIG. 8 provide various views of a clamping solar module connector 20. A bolt 21 goes through a bolt hole 25 on a clamping solar module connector top part 22 and into a threaded hole 26 of a clamping solar module connector bottom part 23. When bolt 21 is tightened into threaded hole 26, clamping solar module connector top part 22 and clamping solar module connector bottom part 23 are pulled together vertically. When clamping solar modules, a slot insert 27 of clamping solar module connector top part 22 is placed within a frame slot of a first solar module and a slot insert 28 of clamping solar module connector bottom part 23 is placed within a frame slot of a second solar module. When clamping solar module connector top part 22 and clamping solar module connector bottom part 23 are pulled together, this locks the first solar module to the second solar module. Bonding teeth 29 on a flange 210 of clamping solar module connector top part 22 are used to create an electrical connection between clamping solar module connector 20 and the second solar module. Bonding teeth 29 on a flange 211 of clamping solar module connector bottom part 23 are used to create an electrical connection between clamping solar module connector 20 and the first solar module. In this way, an electrical connection is established between the first solar module and the second solar module through clamping solar module connector 20.

Bonding pins 164 are placed within slots 165 of clamping solar module connector bottom part 23. For example, each of bonding pins 164 is a stainless steel strip. Bonding pins 164 are inserted into slots 165 with sharp teeth facing outward.

Figure 9:
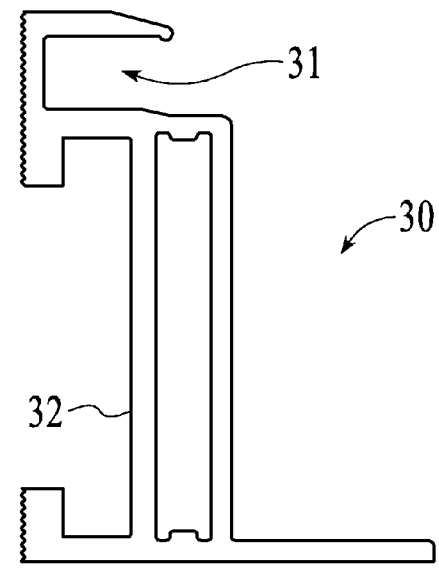
FIG. 9, FIG. 10, FIG. 11 and FIG. 12 show various views of a solar module frame, in accordance with an implementation.
Figure 10:
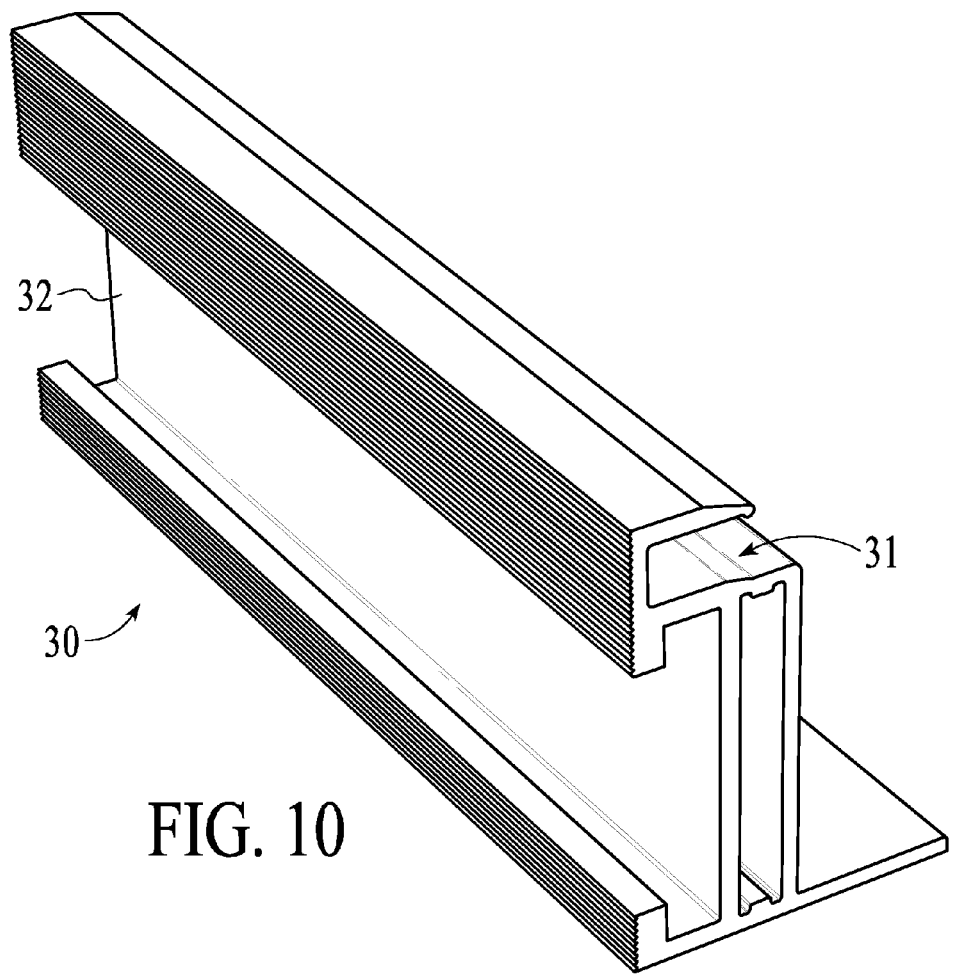
Figure 11:
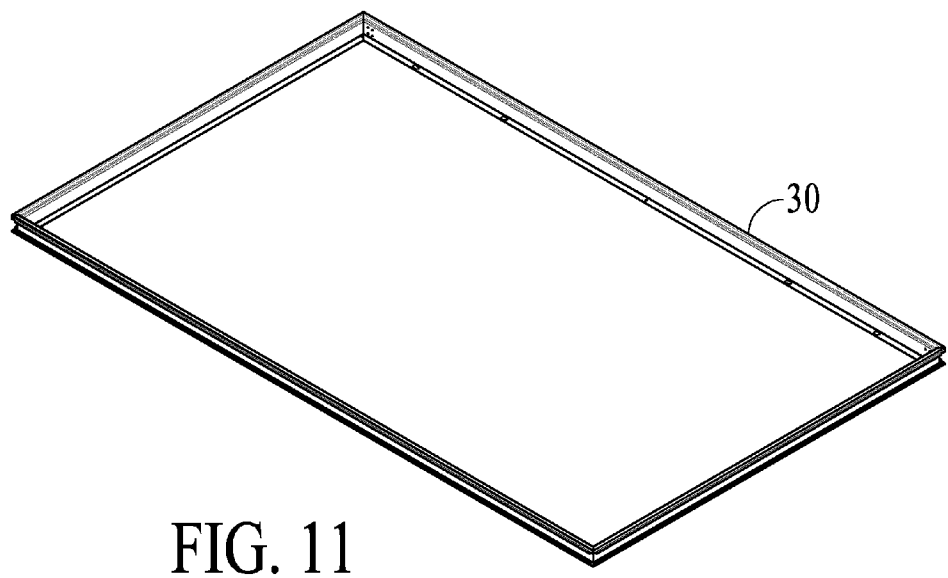
Figure 12:
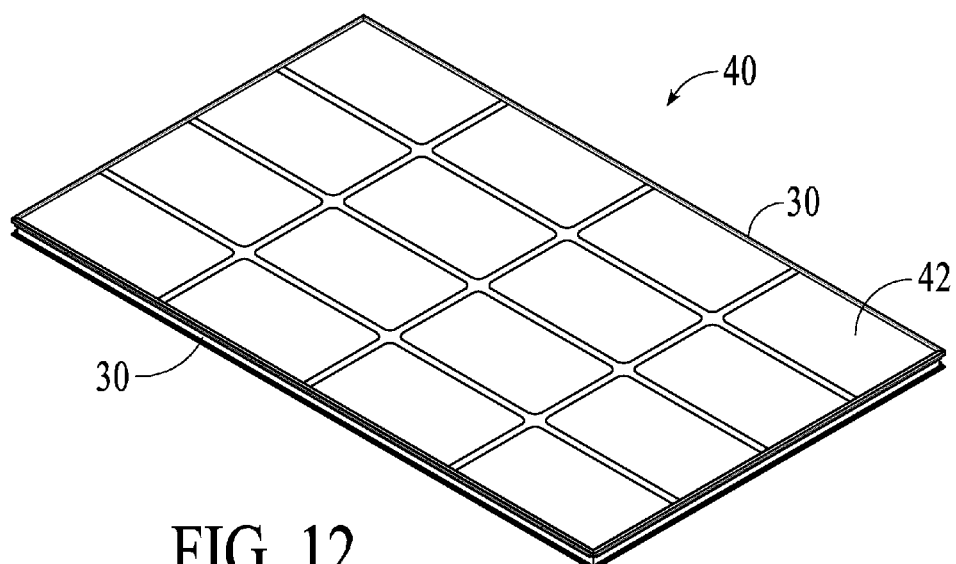

FIG. 9, FIG. 10, FIG. 11 and FIG. 12 show various views of a solar module frame 30. The partial views shown in FIG. 9 and FIG. 10 provide detail about a shape of a frame slot 32 in which is placed a slot insert of an interlocking or clamping solar module connector top part or a slot insert of an interlocking or clamping solar module connector bottom part or a slot insert of the T-bolt. A slot 31 is used by frame 30 to hold solar modules in place. FIG. 11 shows a full view of frame 30. FIG. 12 shows frame 30 surrounding solar panels 42 to form a solar module 40.

Figure 13:
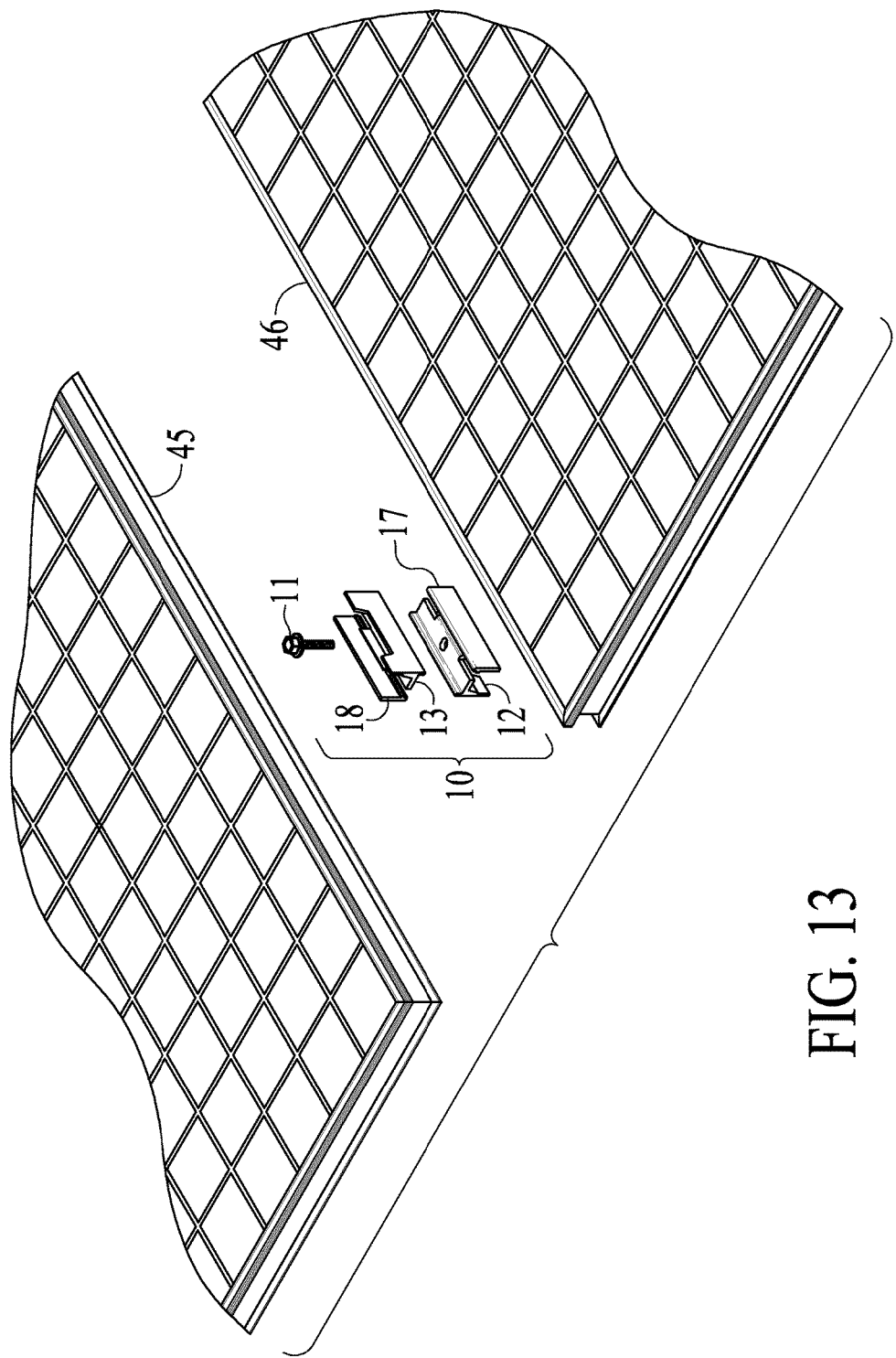
FIG. 13 shows an interlocking solar module connector and two solar modules before assembly, in accordance with an implementation.
Figure 14:
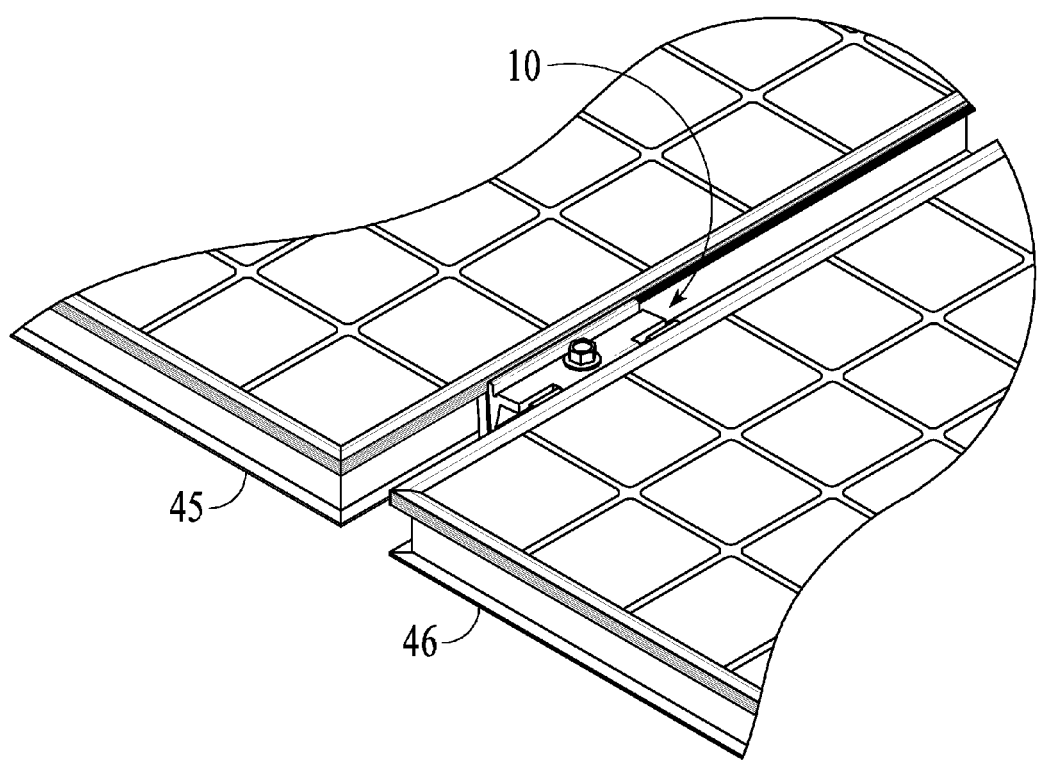
FIG. 14 shows an interlocking solar module connector and two solar modules after assembly, in accordance with an implementation.

FIG. 13, FIG. 14, FIG. 15 and FIG. 16 illustrate a solar module 45 being interlocked with a solar module 46 using interlocking solar module connectors 10. As illustrated by FIG. 13, slot insert 17 of interlocking solar module connector top part 12 is inserted into a frame slot of the solar module frame of solar module 46. Slot insert 18 of interlocking solar module connector bottom part 13 is inserted into a frame slot of the solar module frame of solar module 45. Interlocking solar module connector top part 12 and interlocking solar module connector bottom part 13 are then assembled and bolt 11 is tightened so that interlocking solar module connector 10 secures solar module 45 to solar module 46, as shown in FIG. 14.

Figure 15:
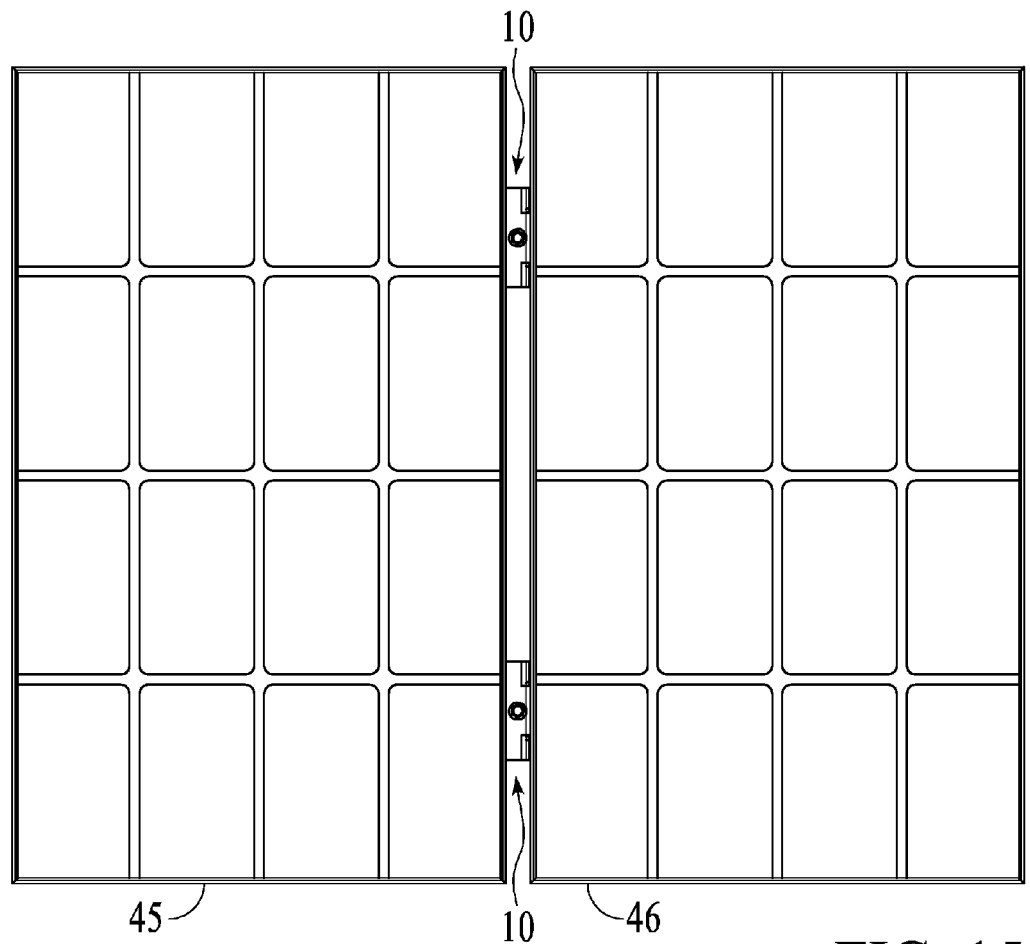
FIG. 15 shows two interlocking solar module connectors connecting two solar modules, in accordance with an implementation.
Figure 16:
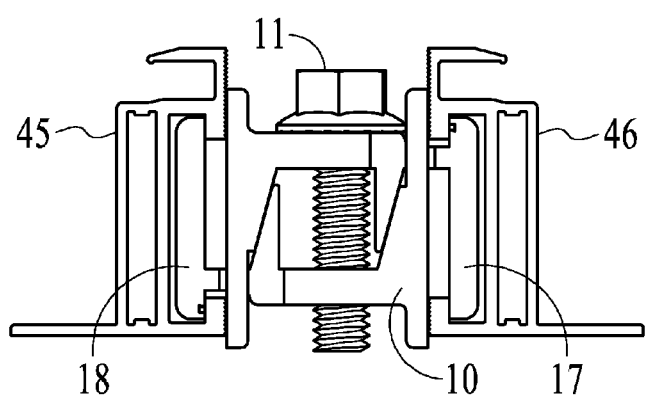
FIG. 16 is a section view of an interlocking solar module connector connecting two solar modules after assembly.

FIG. 15 illustrates that two or more interlocking solar module connectors 10 may be used to secure solar module 45 to solar module 46. FIG. 16 illustrates that when bolt 11 is tightened, interlocking solar module connector top part 12 and interlocking solar module connector bottom part 13 are pulled together so that bonding teeth 19 of interlocking solar module connector top part 12 will push against the solar module frame of solar module 46 and bonding teeth 19 of interlocking solar module connector bottom part 13 will push against the solar module frame of solar module 45. Bonding teeth 19 of interlocking solar module connector top part 12 will establish an electrical connection between interlocking solar module connector 10 and the solar module frame of solar module 46. Bonding teeth 19 of interlocking solar module connector bottom part 13 will establish an electrical connection between interlocking solar module connector 10 and the solar module frame of solar module 45. This creates an electrical connection between solar module 45 and solar module 46. Alternatively, or in addition, bonding pins may be used to provide an electrical connection.

Figure 17:
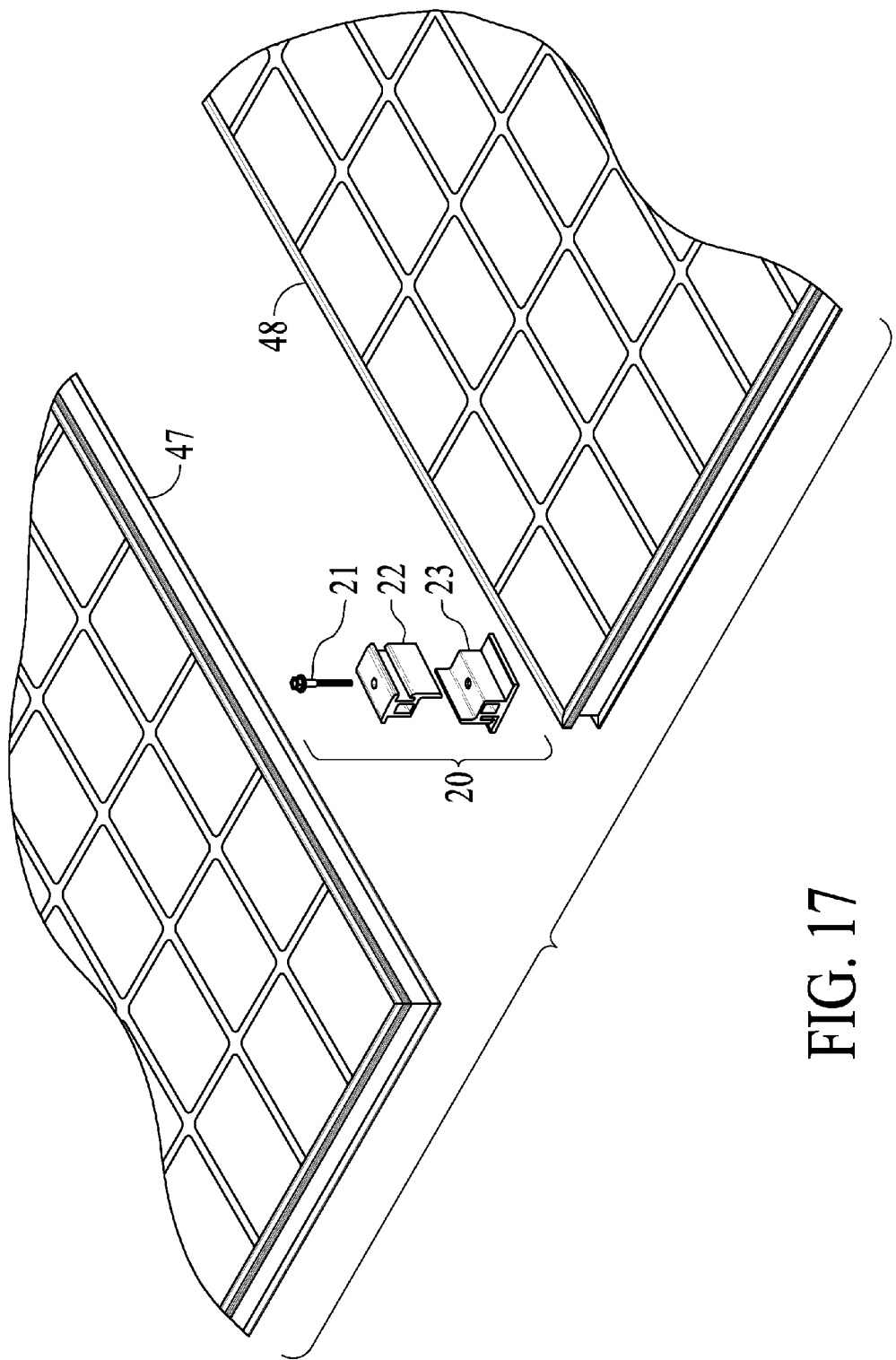
FIG. 17 shows a clamping solar module connector and two solar modules before assembly, in accordance with an implementation.
Figure 18:
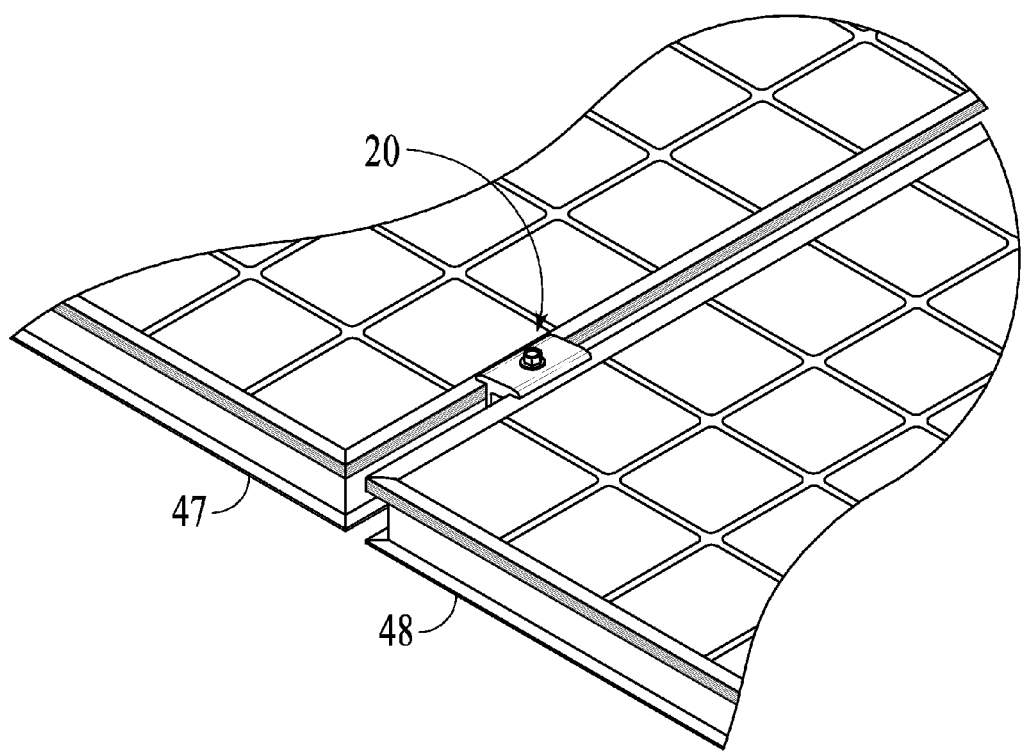
FIG. 18 shows a clamping solar module connector and two solar modules after assembly, in accordance with an implementation.

FIG. 17, FIG. 18, FIG. 19 and FIG. 20 illustrate a solar module 47 being interlocked with a solar module 48 using clamping solar module connectors 20. As illustrated by FIG. 17, slot insert 27 of clamping solar module connector bottom part 23 is inserted into a frame slot of the solar module frame of solar module 48. Slot insert 28 of clamping solar module connector top part 22 is inserted into a frame slot of the solar module frame of solar module 47. Clamping solar module connector top part 22 and clamping solar module connector bottom part 23 are then assembled and bolt 21 is tightened so that clamping solar module connector 20 secures solar module 47 to solar module 48, as shown in FIG. 18.

Figure 19:
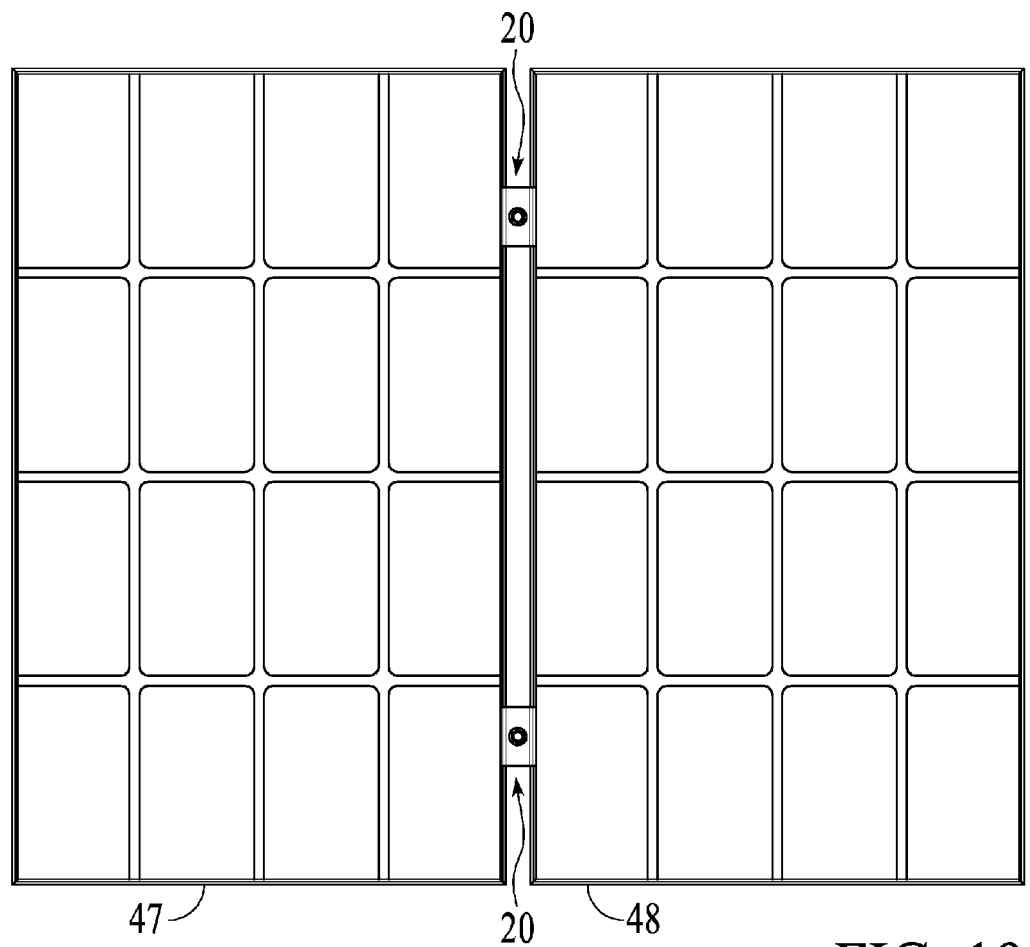
FIG. 19 shows two clamping solar module connectors connecting two solar modules, in accordance with an implementation.
Figure 20:
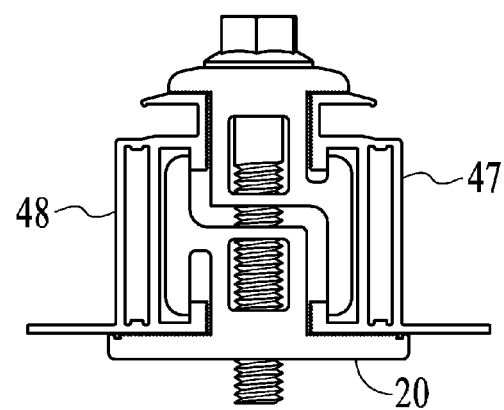
FIG. 20 is a section view of a clamping solar module connector connecting two solar modules after assembly, in accordance with an implementation.
Figure 21:
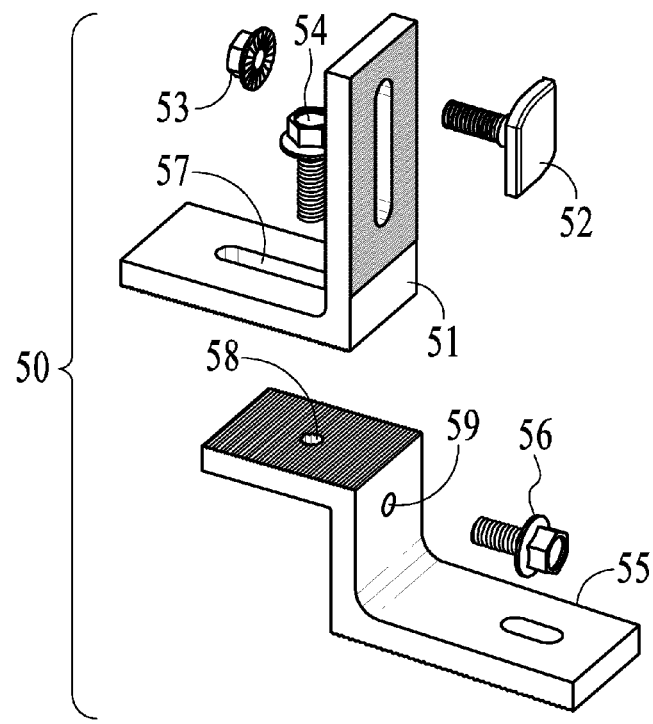
FIG. 21, FIG. 22, FIG. 23 and FIG. 24 show a comp foot roof attachment before and after assembly, in accordance with an implementation.
Figure 22:
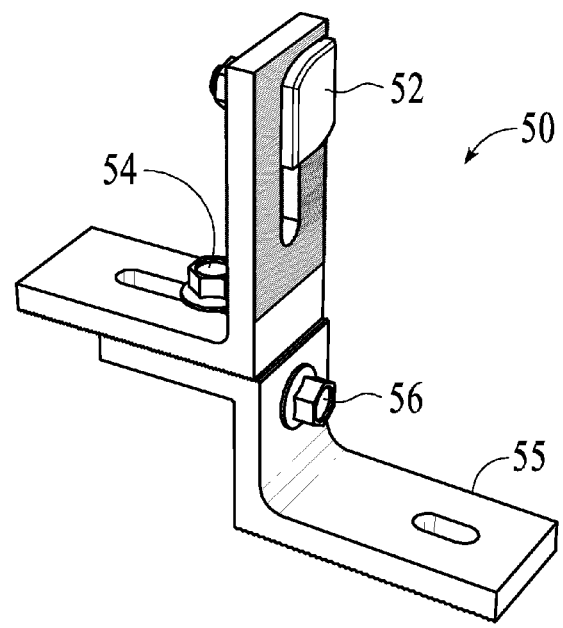

FIG. 19 illustrates that two or more clamping solar module connectors 20 may be used to secure solar module 47 to solar module 48. FIG. 20 illustrates that when bolt 21 is tightened, clamping solar module connector top part 22 and clamping solar module connector bottom part 23 are pulled together so that bonding teeth 29 of clamping solar module connector top part 22 will push against the solar module frame of solar module 47 and bonding teeth 29 of clamping solar module connector bottom part 23 will push against the solar module frame of solar module 48. Bonding teeth 29 of clamping solar module connector top part 22 will establish an electrical connection between clamping solar module connector 20 and the solar module frame of solar module 47. Bonding teeth 29 of clamping solar module connector bottom part 23 will establish an electrical connection between clamping solar module connector 20 and the solar module frame of solar module 48. This creates an electrical connection between solar module 47 and solar module 48 through clamping solar module connector 20. Alternatively, or in addition, bonding pins may be used to provide an electrical connection.

Figure 23:
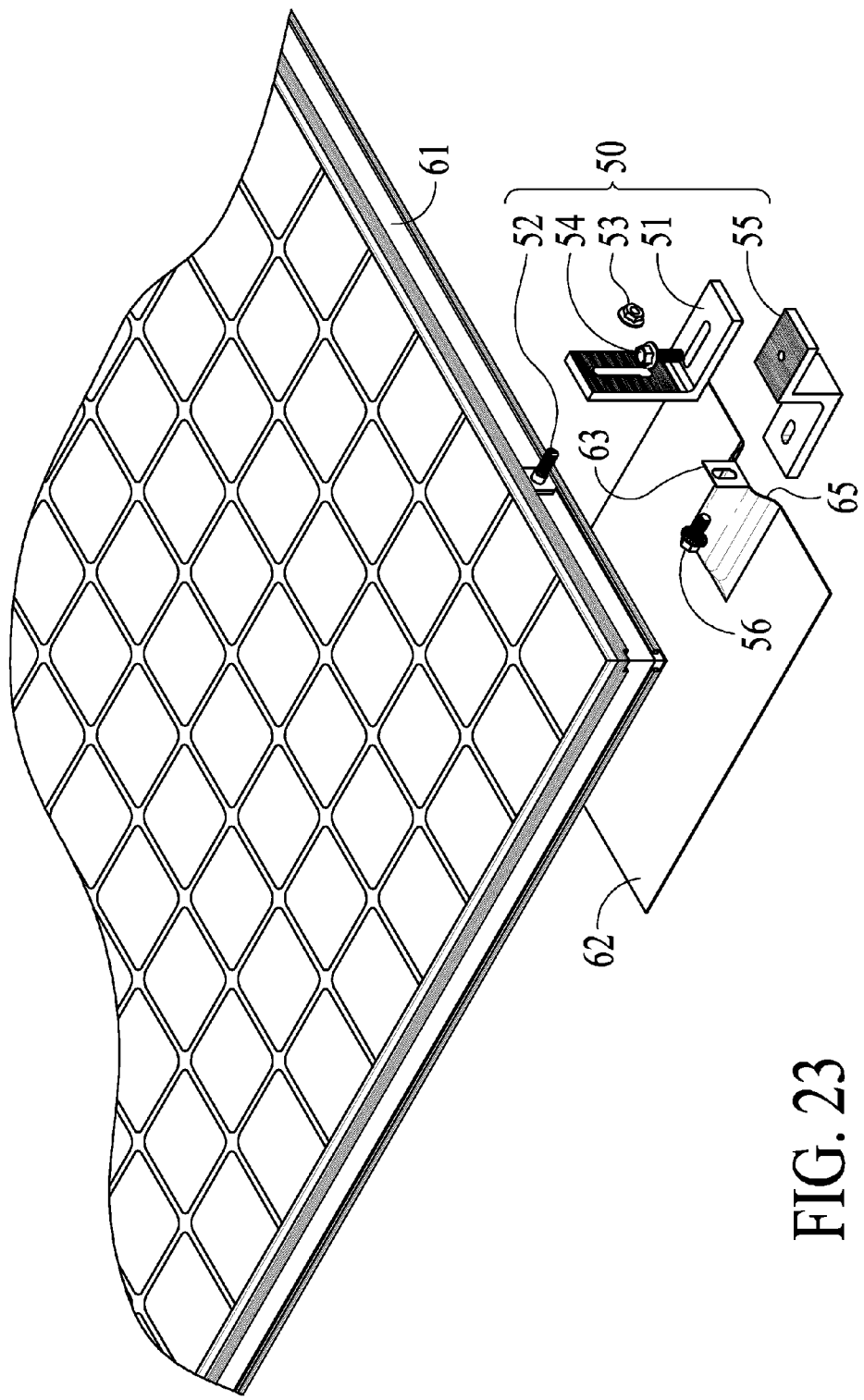
Figure 24:
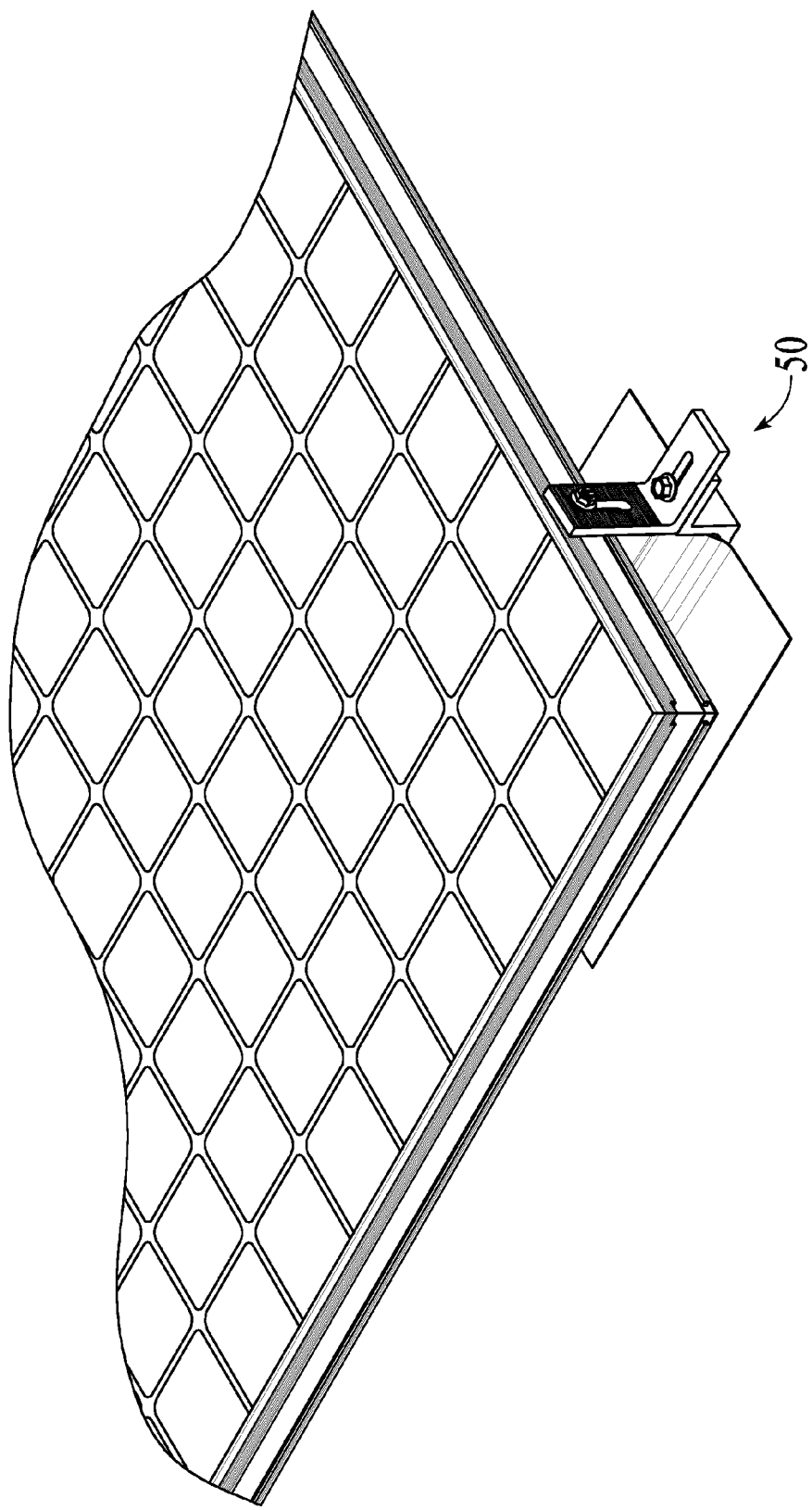
Figure 25:
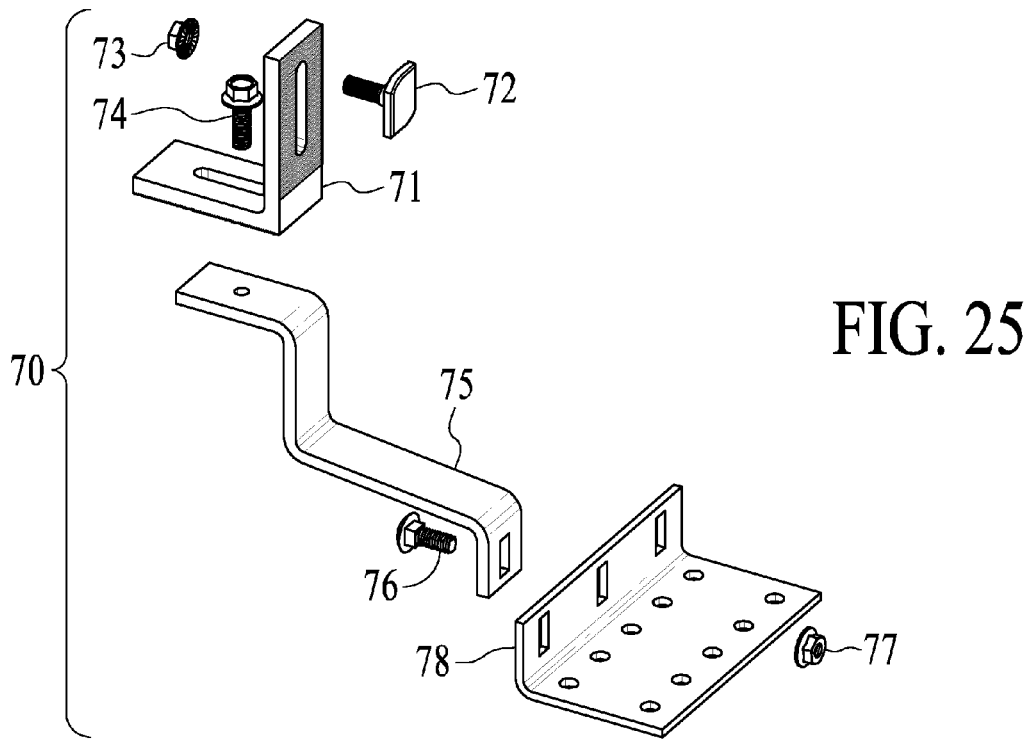
FIG. 25, FIG. 26, FIG. 27 and FIG. 28 show a tile foot roof attachment before and after assembly, in accordance with an implementation.
Figure 26:
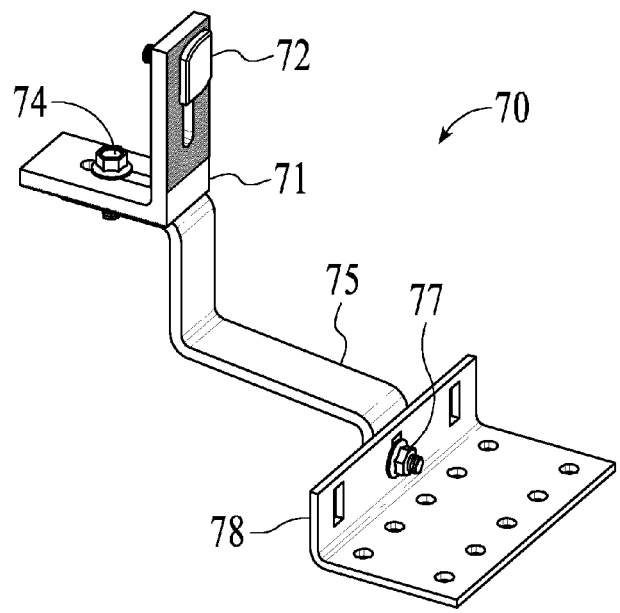

FIG. 21, FIG. 22, FIG. 23 and FIG. 24 provide various views of comp foot roof attachment 50 used to attach a solar module to a composition roof. A T-bolt 52 is placed within a slot of a solar module frame for a solar module 61. A nut 53 is used to tighten T-bolt 52. A bolt 54 goes through a slot 57 of L-bracket 51 and into a threaded hole 58 of a comp foot base 55. As shown in FIG. 23 and FIG. 24, when nut 53 is tightened onto T-bolt 52, this holds the solar module frame of a solar module 61 tightly to comp foot roof attachment 50.

Also, as shown by FIG. 23 and FIG. 24, after comp foot base 55 is attached to a roof, a comp foot flashing 62 with an opening 65 is placed over comp foot base 55. A bolt 56 placed through a bracket 63 of comp foot flashing 62 and into a threaded hole 59 is used to secure interlocking solar module connector 50 and comp foot flashing 62. In this way, solar module 61 is secured to a roof and composition foot flashing 62 protects against moisture penetrating the roof where comp foot base 55 is attached to the roof.

For a tile roof, the base of the roof attachment has some interchangeable components that can be selected to match the type of tile used for a roof. For example, to take into account variation in tile length of tiles and the positioning requires of the L-bracket with respect to the top edge and bottom edge of a tile, three types of tile feet are described below. These versions are tile foot, long tile foot and double tile feet. The long tile foot has an extended and reinforced L-bracket. Also to accommodate roofs where the edge of the solar module is in the middle or near the middle of a tile, double tile feet are used. The double tile feet version is more versatile than the long tile foot version and makes it possible to position the L-bracket anywhere from the top edge to the bottom edge of the tile. The purpose of the base of the roof attachment is to secure the roof attachment to the roof with proper flashing before the solar module is installed. This provides a platform for the L-bracket to be secured to the roof with flexibility of horizontal adjustment and solar module height adjustment.

Figure 43:
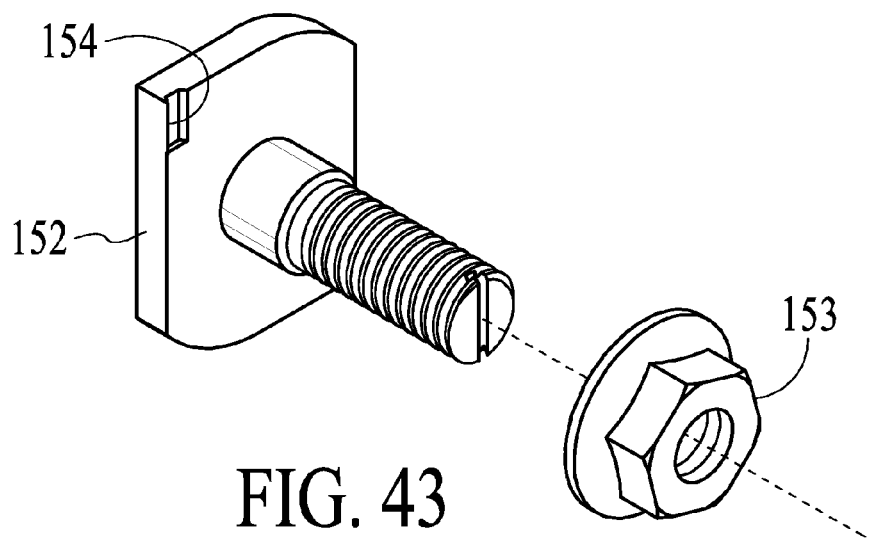
FIG. 43 and FIG. 44 show views of a T-bolt in accordance with an implementation
Figure 44:
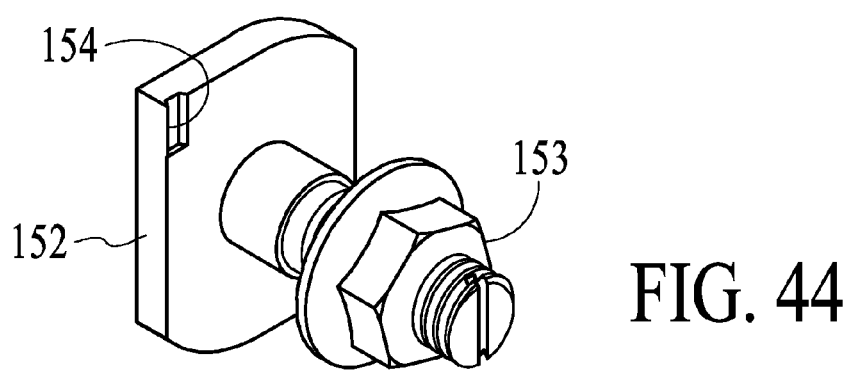

An alternative embodiment of a T-bolt is shown in FIG. 43 and FIG. 44. A T-bolt 152 T-bolt has a sharp edge 154 at one or more corners on the backside of the bolt top. T-bolt 152 snaps inside a slot of a solar module, turns 90 degrees, and then is tightened with a nut 153. When T-bolt 152 is tightened, sharp edge 154 will pierce inside the solar module and create an electrical bonding path through which electrical current can flow.

Figure 27:
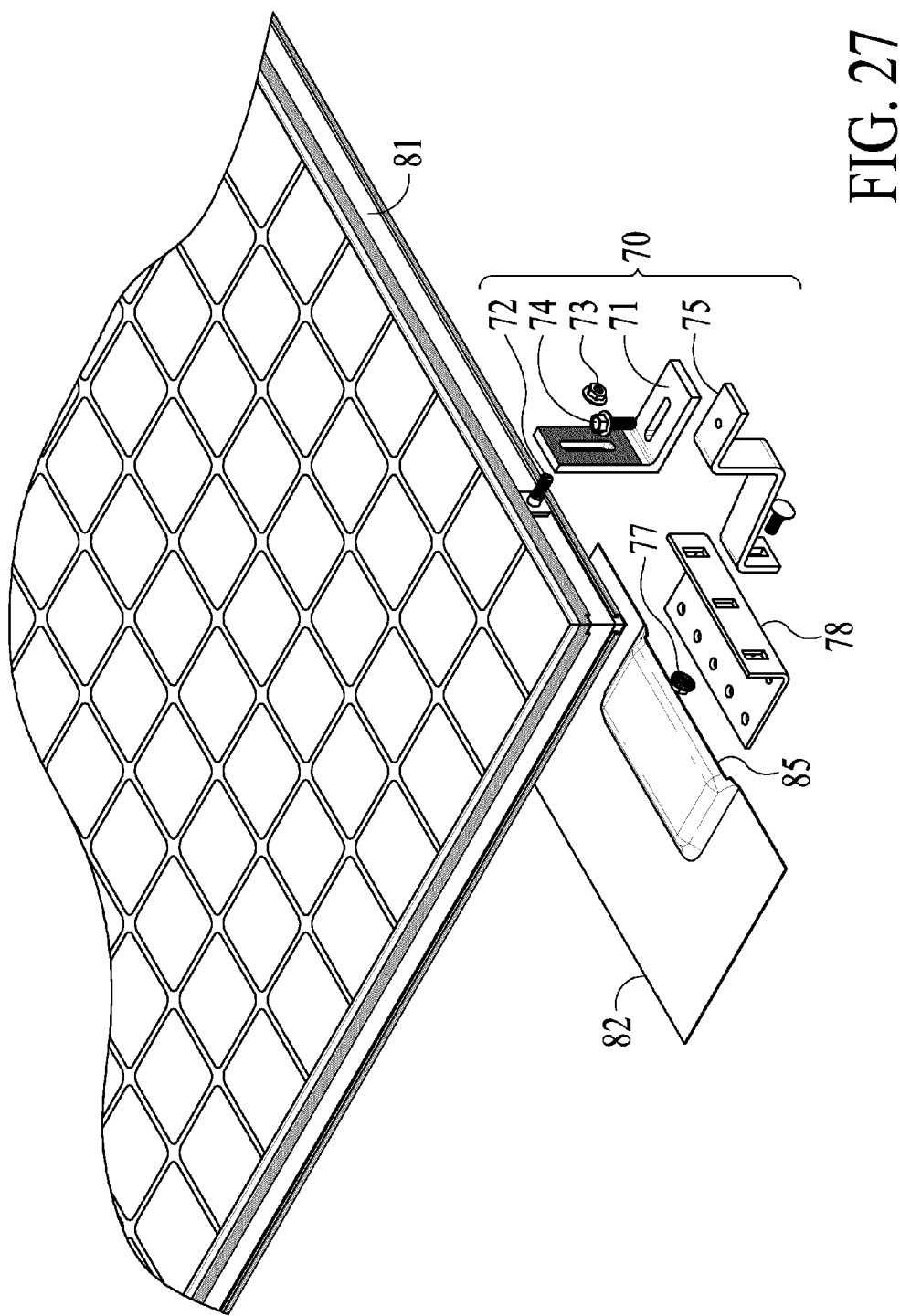
Figure 28:
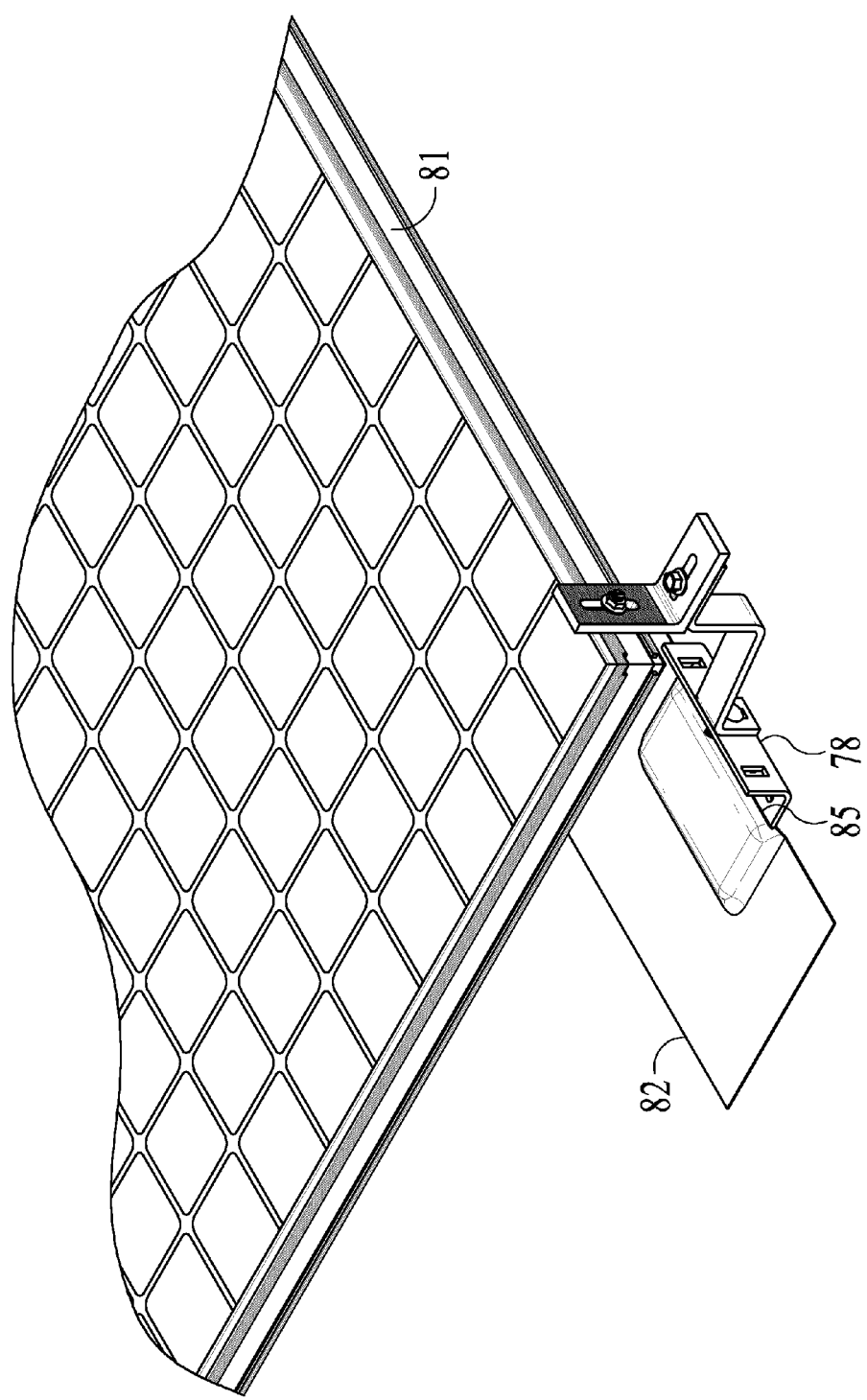
Figure 29:
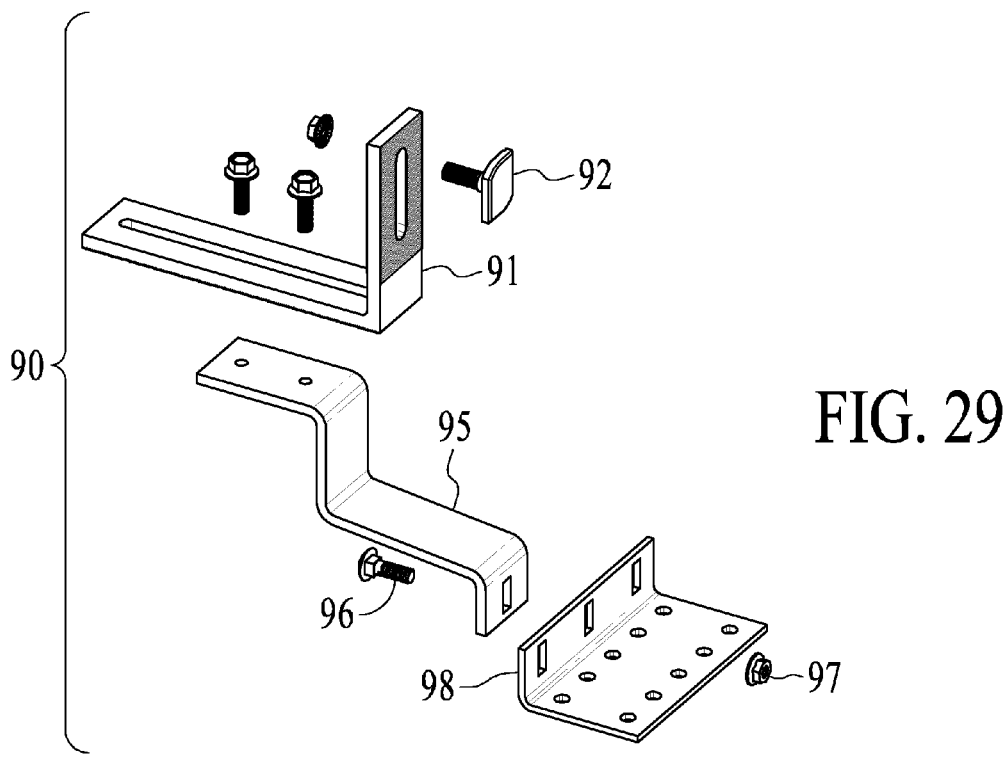
FIG. 29, FIG. 30, FIG. 31 and FIG. 32 show a long tile foot roof attachment before and after assembly, in accordance with an implementation.
Figure 30:
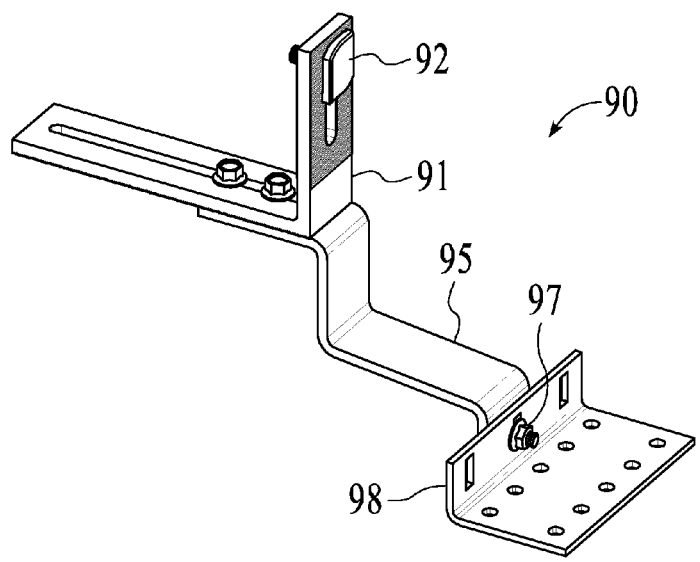

FIG. 25, FIG. 26, FIG. 27 and FIG. 28 provide various views of a tile foot roof attachment 70 used to attach a solar module to a tile roof. A T-bolt 72 is placed within a slot of a solar module frame for a solar module 81. A nut 73 is used to tighten T-bolt 72. A bolt 74 goes through a slot of L-bracket 71 and into a threaded hole of a tile foot arm 75. A bolt 76 and a nut 77 secure tile foot arm 75 to a tile foot base 78. As shown in FIG. 27 and FIG. 28, when nut 73 is tightened onto T-bolt 72, this holds the solar module frame of a solar module 81 tightly to tile foot roof attachment 70.

Also, as shown by FIG. 27 and FIG. 28, after tile foot base 78 is attached to a roof, a tile foot flashing 82 with an opening 85 is placed over tile foot base 78. In this way, solar module 81 is secured to a roof and tile foot flashing 82 protects against moisture penetrating the roof where tile foot base 78 is attached to the roof.

Figure 31:
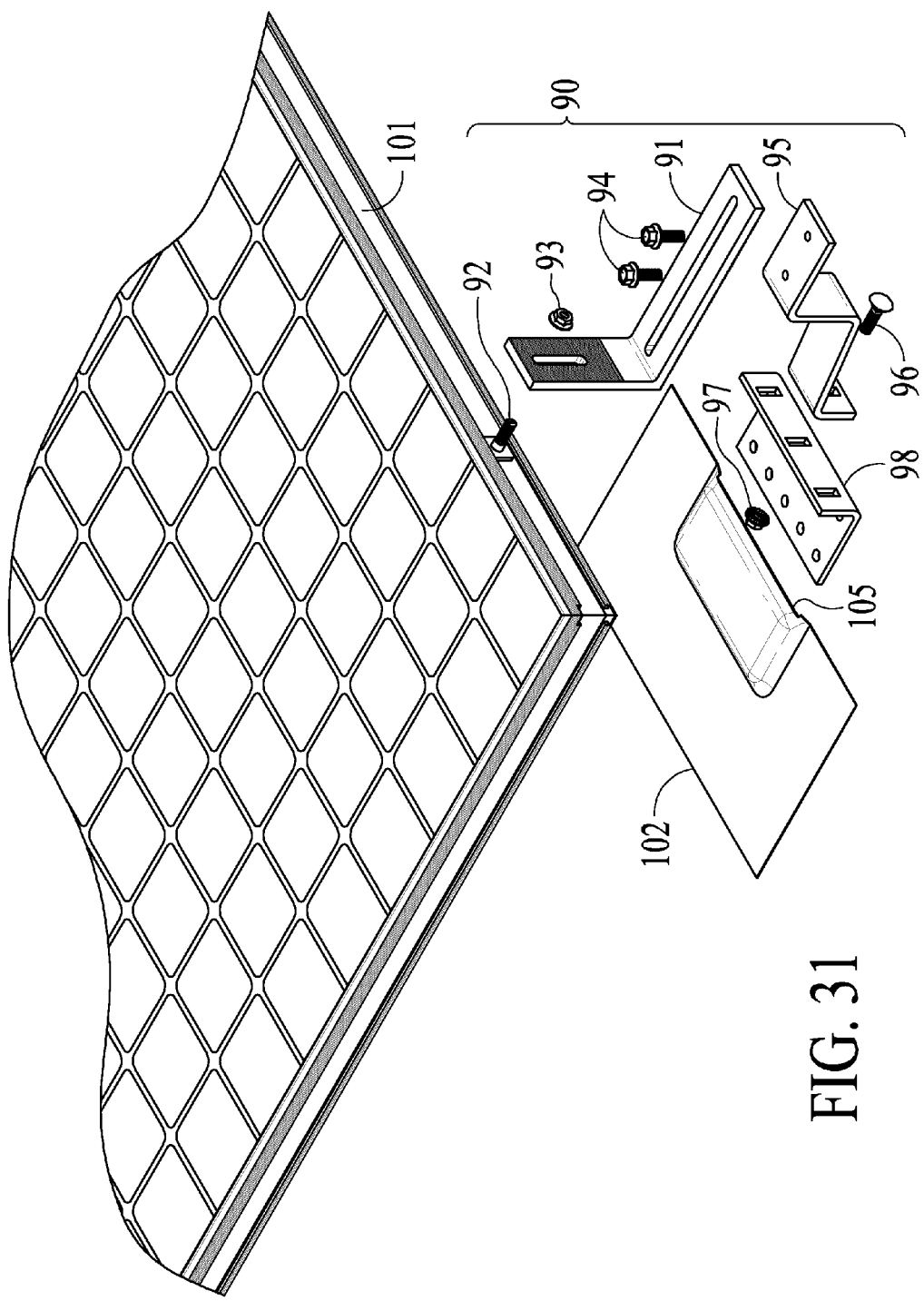
Figure 32:
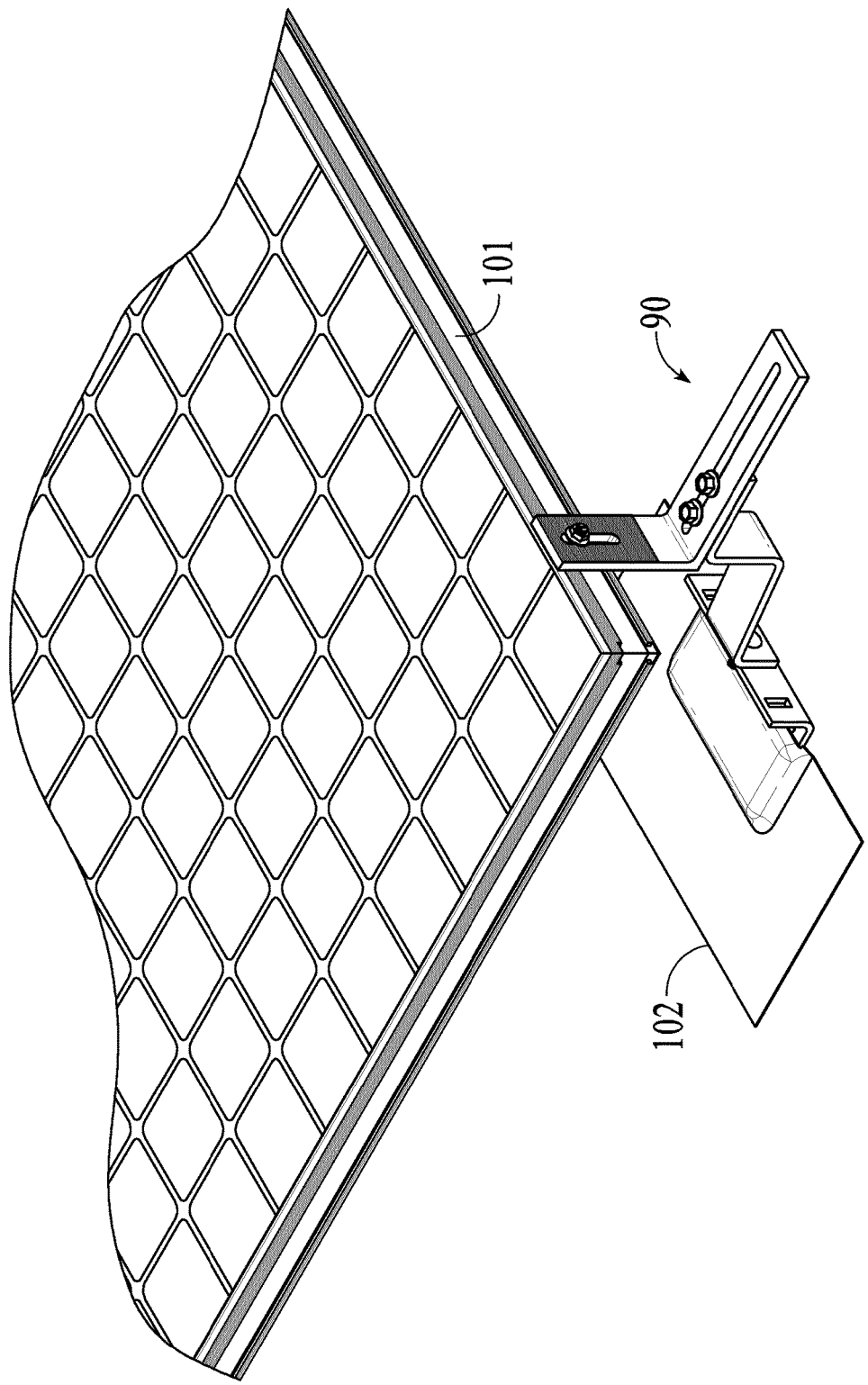
Figure 33:
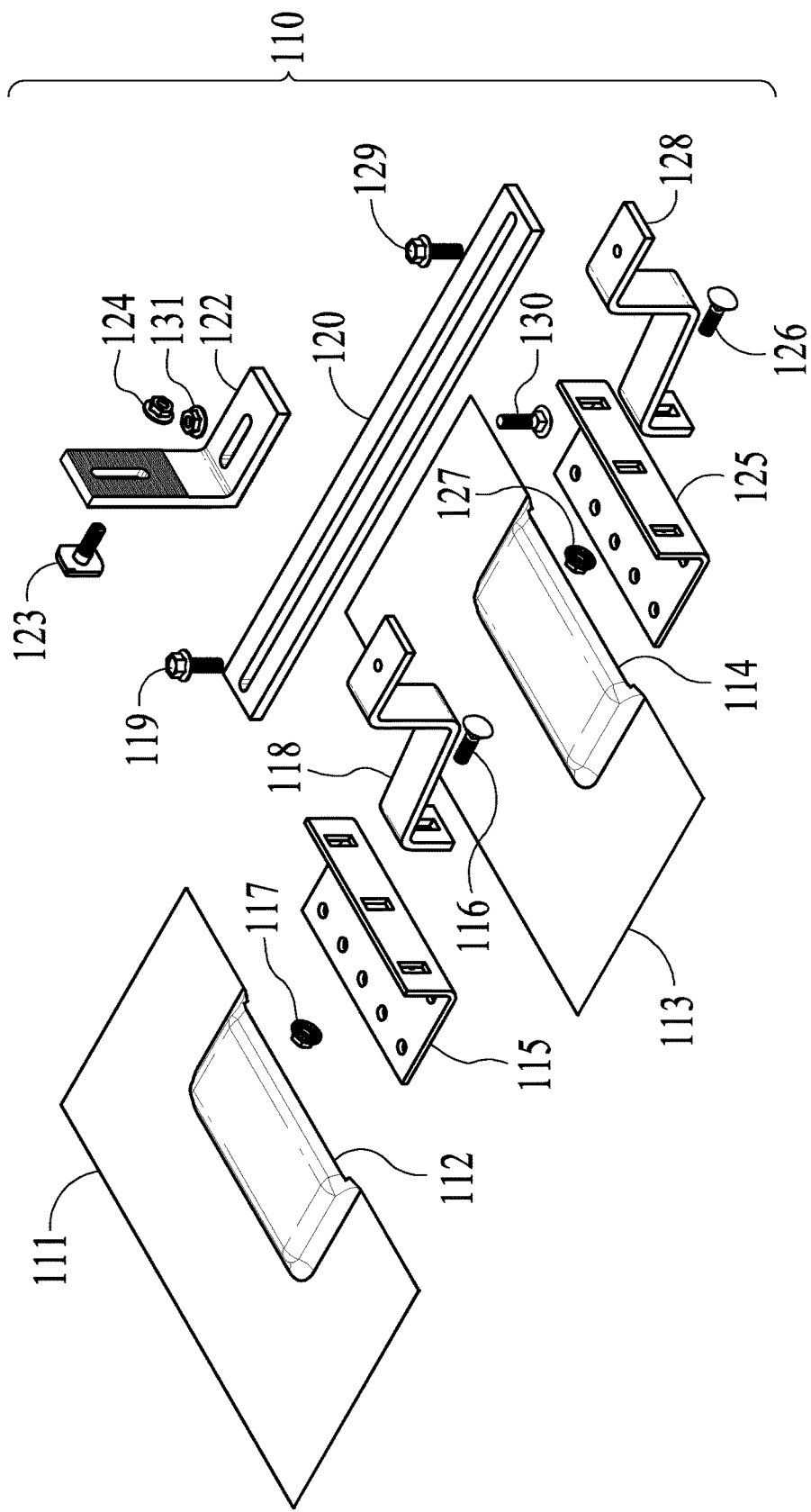
FIG. 33, FIG. 34, FIG. 35 and FIG. 36 show a double tile feet roof attachment before and after assembly, in accordance with an implementation.
Figure 34:
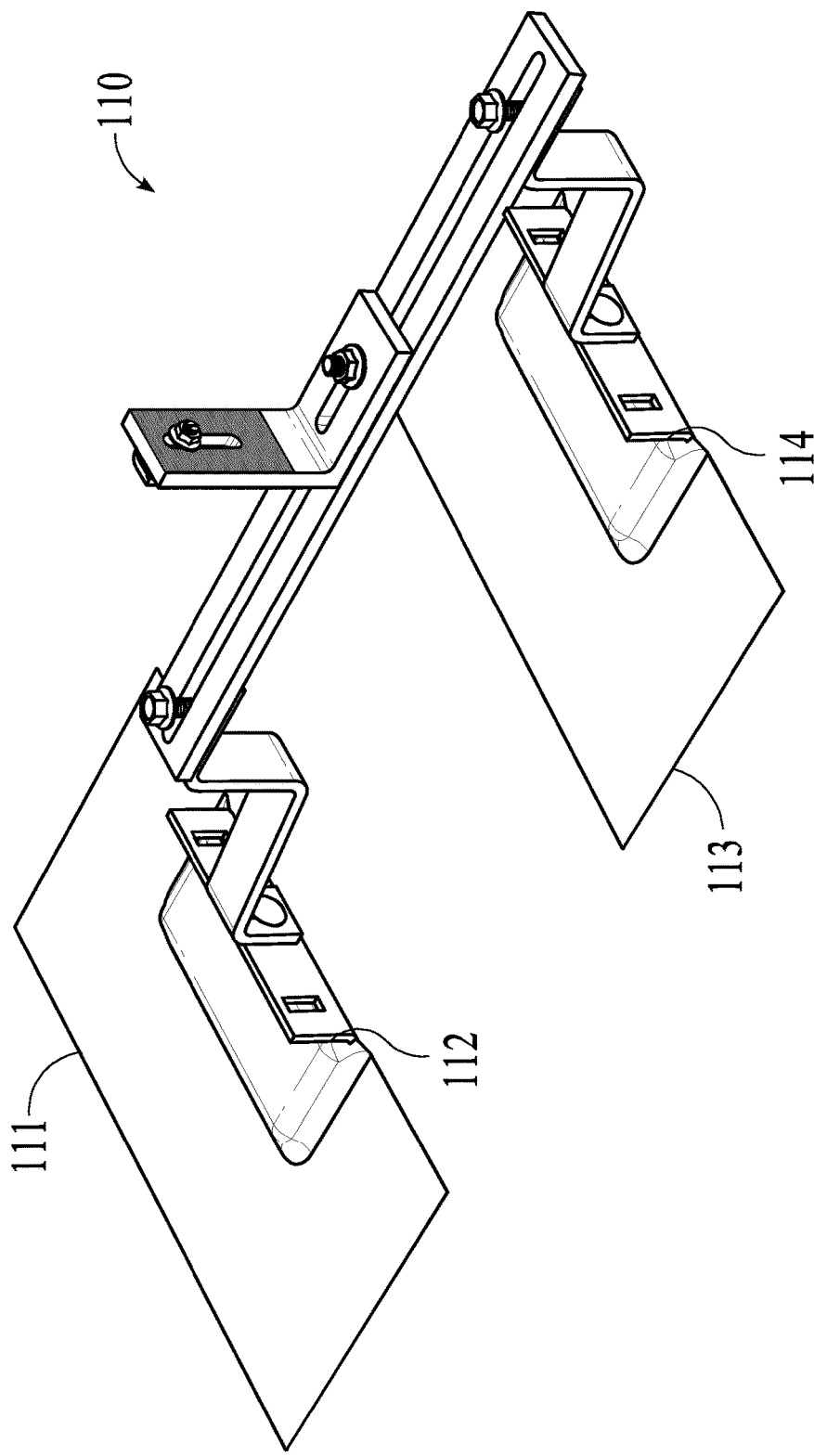

FIG. 29, FIG. 30, FIG. 31 and FIG. 32 provide various views of long tile foot roof attachment 90 used to attach a solar module to a tile roof with long tiles. A T-bolt 92 is placed within a slot of a solar module frame for a solar module 101. A nut 93 is used to tighten T-bolt 92. Bolts 94 go through a slot of L-bracket 91 and into threaded holes of a tile foot arm 95. A bolt 96 and a nut 97 secure tile foot arm 95 to a tile foot base 98. As shown in FIG. 31 and FIG. 32, when nut 93 is tightened onto T-bolt 92, this holds the solar module frame of a solar module 101 tightly to long tile foot roof attachment 90.

Also, as shown by FIG. 31 and FIG. 32, after tile foot base 98 is attached to a roof, a tile foot flashing 102 with an opening 105 is placed over tile foot base 98. In this way, solar module 101 is secured to a roof and tile foot flashing 102 protects against moisture penetrating the roof where tile foot base 98 is attached to the roof.

FIG. 33, FIG. 34, FIG. 35 and FIG. 36 provide various views of double tile feet roof attachment 110 used to attach a solar module to a tile roof. A T-bolt 123 is placed within a slot of a solar module frame for a solar module 135. A nut 124 is used to tighten T-bolt 123. A bolt 130 and a nut 131 are used to attach a L-bracket 122 to a bridge 120. A bolt 119 goes through a slot of bridge 120 and into a threaded hole of a tile foot arm 118. A bolt 129 goes through the slot of bridge 120 and into a threaded hole of a tile foot arm 128.

A bolt 116 and a nut 117 secure tile foot arm 118 to a tile foot base 115. After tile foot base 115 is attached to a roof, a tile foot flashing 111 with an opening 112 is placed over tile foot base 115. In this way, when solar module 135 is secured to a roof, tile foot flashing 111 protects against moisture penetrating the roof where tile foot base 115 is attached to the roof.

A bolt 126 and a nut 127 secure tile foot arm 128 to a tile foot base 125. After tile foot base 125 is attached to a roof, a tile foot flashing 113 with an opening 114 is placed over tile foot base 125. In this way, when solar module 135 is secured to a roof, tile foot flashing 113 protects against moisture penetrating the roof where tile foot base 125 is attached to the roof.

Figure 35:
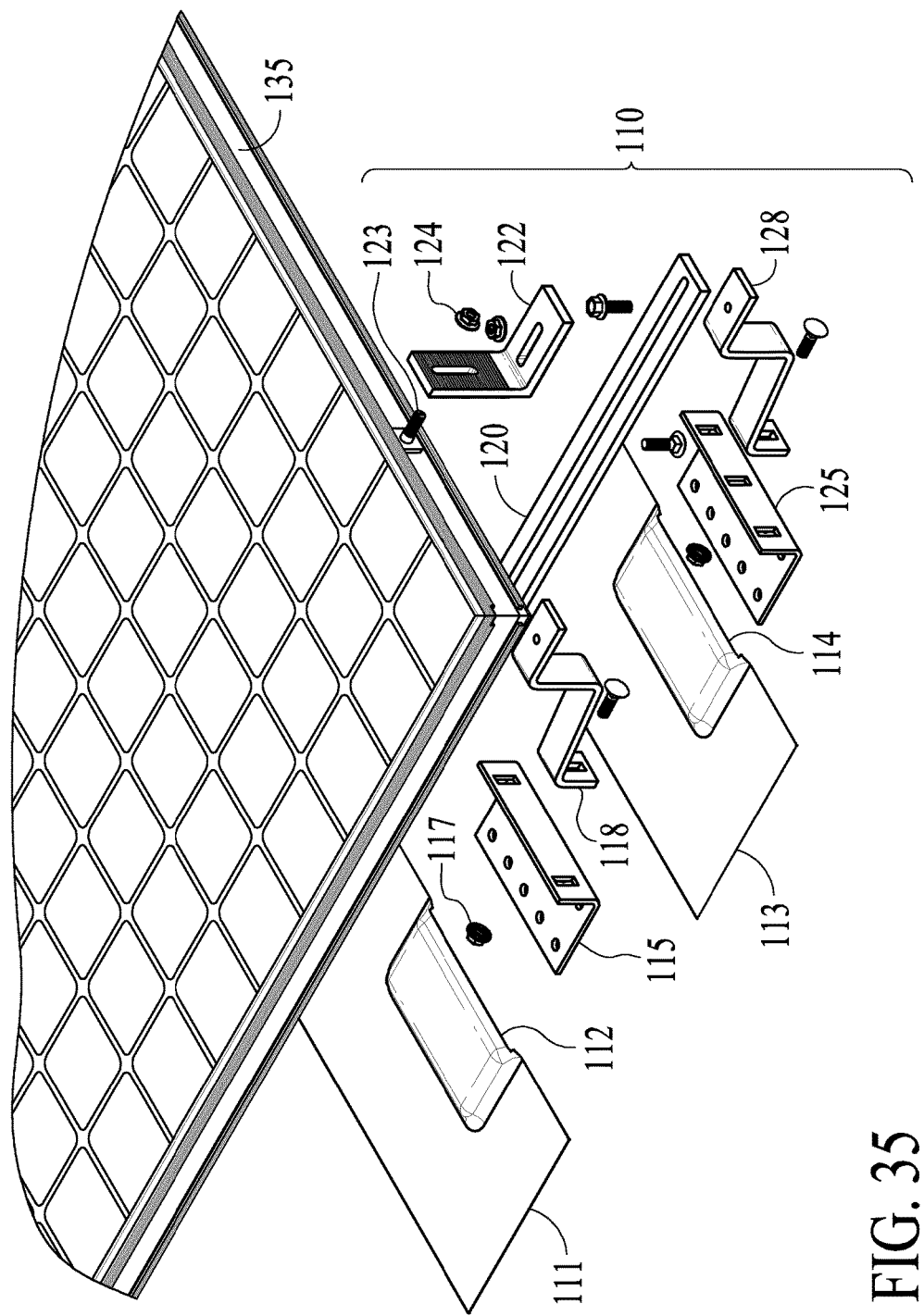
Figure 36:
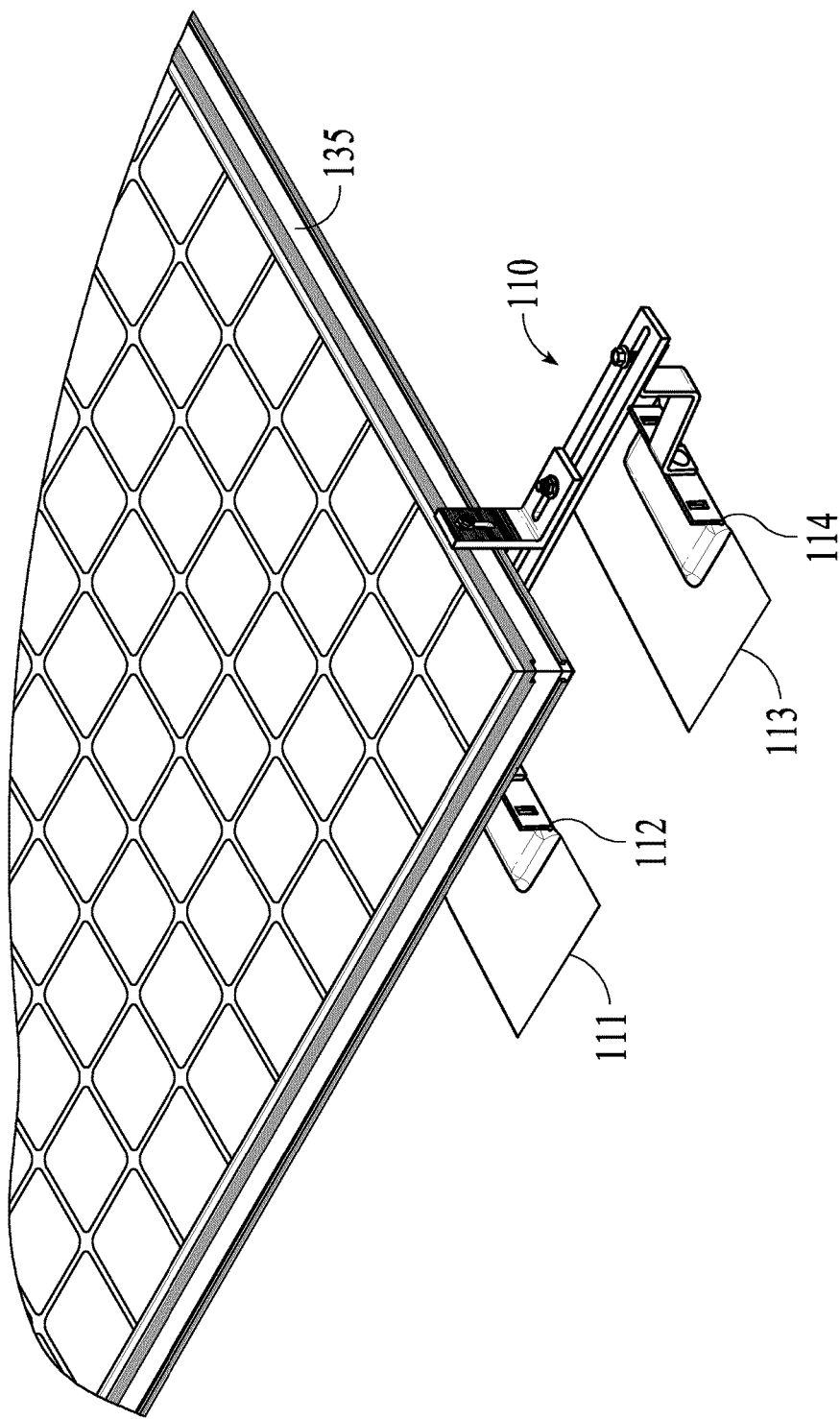
Figure 37:
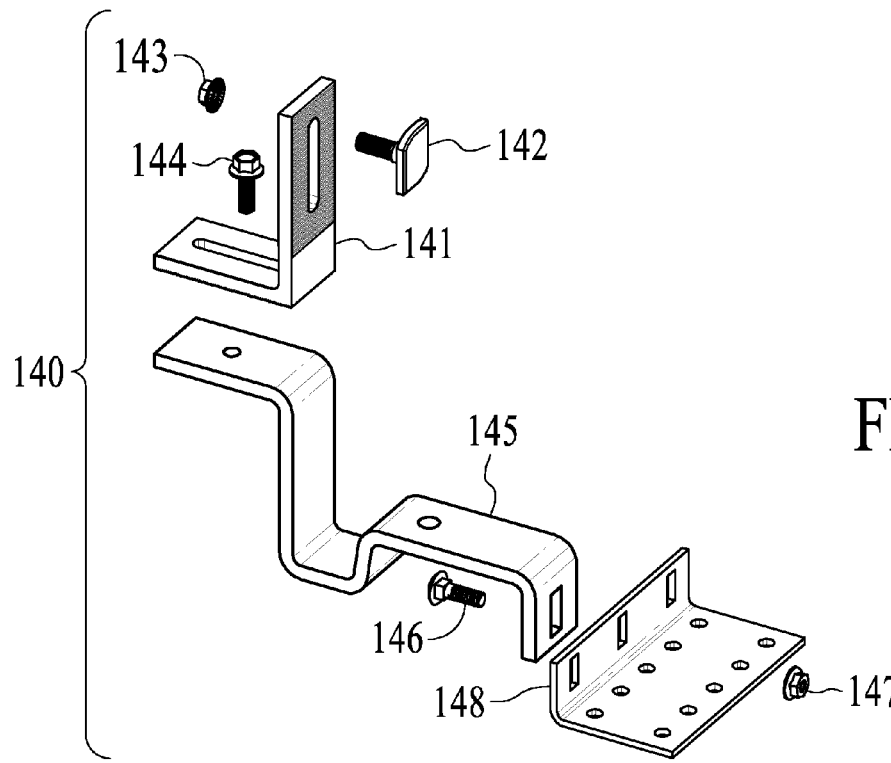
FIG. 37, FIG. 38, FIG. 39 and FIG. 40 show a steel-roof tile foot roof attachment before and after assembly, in accordance with an implementation.
Figure 38:
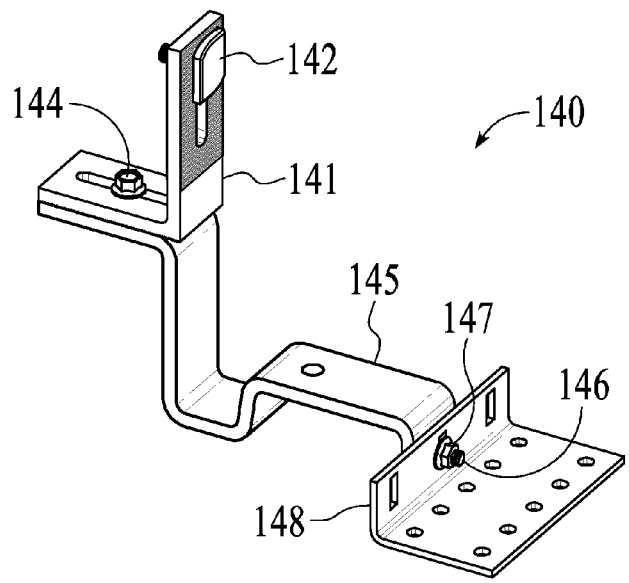

As shown in FIG. 35 and FIG. 36, when nut 124 is tightened onto T-bolt 123, this holds the solar module frame of a solar module 135 tightly to double tile feet roof attachment 110.

Figure 39:
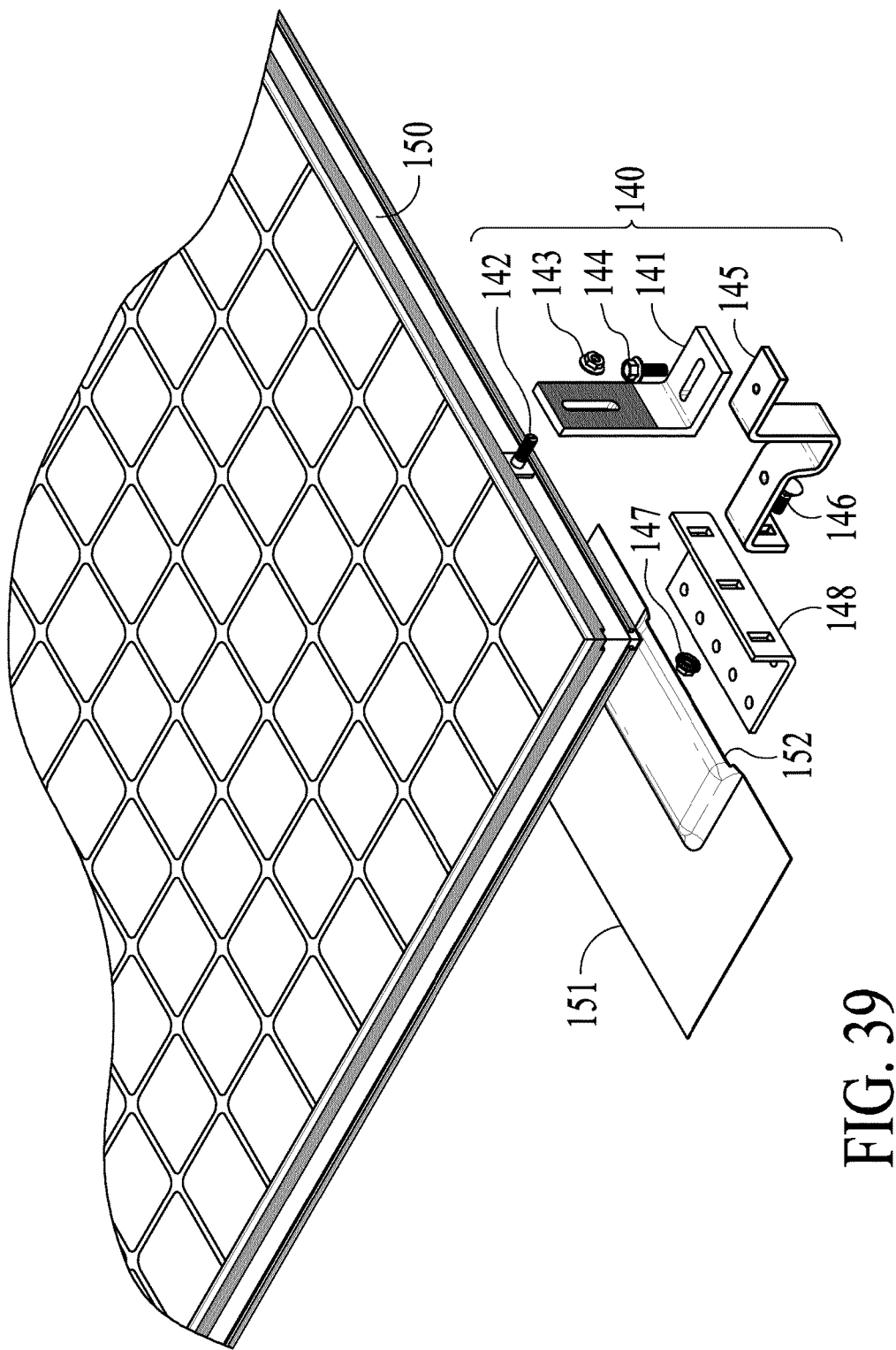
Figure 40:
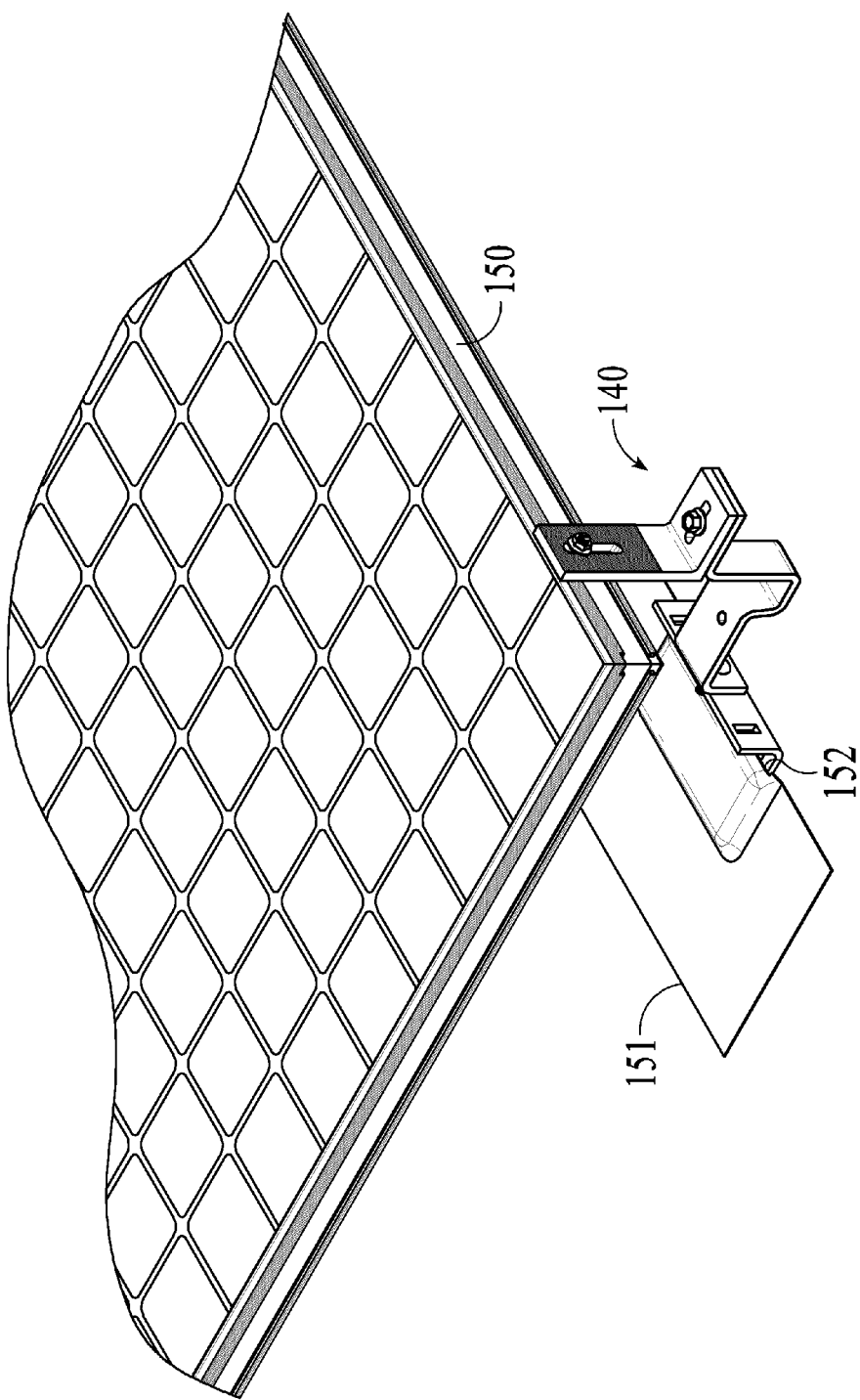

FIG. 37, FIG. 38, FIG. 39 and FIG. 40 provide various views of steel foot roof attachment 140 used to attach a solar module to a steel roof. A T-bolt 142 is placed within a slot of a solar module frame for a solar module 151. A nut 143 is used to tighten T-bolt 142. A bolt 144 goes through a slot of L-bracket 141 and into a threaded hole of a steel foot arm 145. A bolt 146 and a nut 147 secure steel foot arm 145 to a steel foot base 148. As shown in FIG. 39 and FIG. 40, when nut 143 is tightened onto T-bolt 142, this holds the solar module frame of a solar module 151 tightly to steel foot roof attachment 140.

Also, as shown by FIG. 39 and FIG. 40, after steel foot base 148 is attached to a roof, a steel foot flashing 151 with an opening 152 is placed over steel foot base 148. In this way, solar module 150 is secured to a roof and steel foot flashing 151 protects against moisture penetrating the roof where steel foot base 148 is attached to the roof.

In each of the implementations shown in FIGS. 21 through 40, the slot on the vertical part of the L-bracket is to adjust the height of the solar module when the solar module is attached to the roof attachment. This solves the problem of an unleveled roof. The slot on the horizontal part of L-bracket is to adjust the positions of the L-bracket forward or backward horizontally. After the horizontal adjustment, the L-bracket can be secured to the rest of the roof attachment that is already attached to roof. Once the L-bracket is precisely positioned with solar module through vertical and horizontal slots, the T-bolt and nut secure the L-bracket to solar module and another bolt or bolts secure the L-bracket to the rest of the roof attachment at the same time, which make precise positioning of the L-bracket and solar module height adjustment easy and possible. The bolts or nuts face up or outside, which can be tightened easily.

Figure 41:
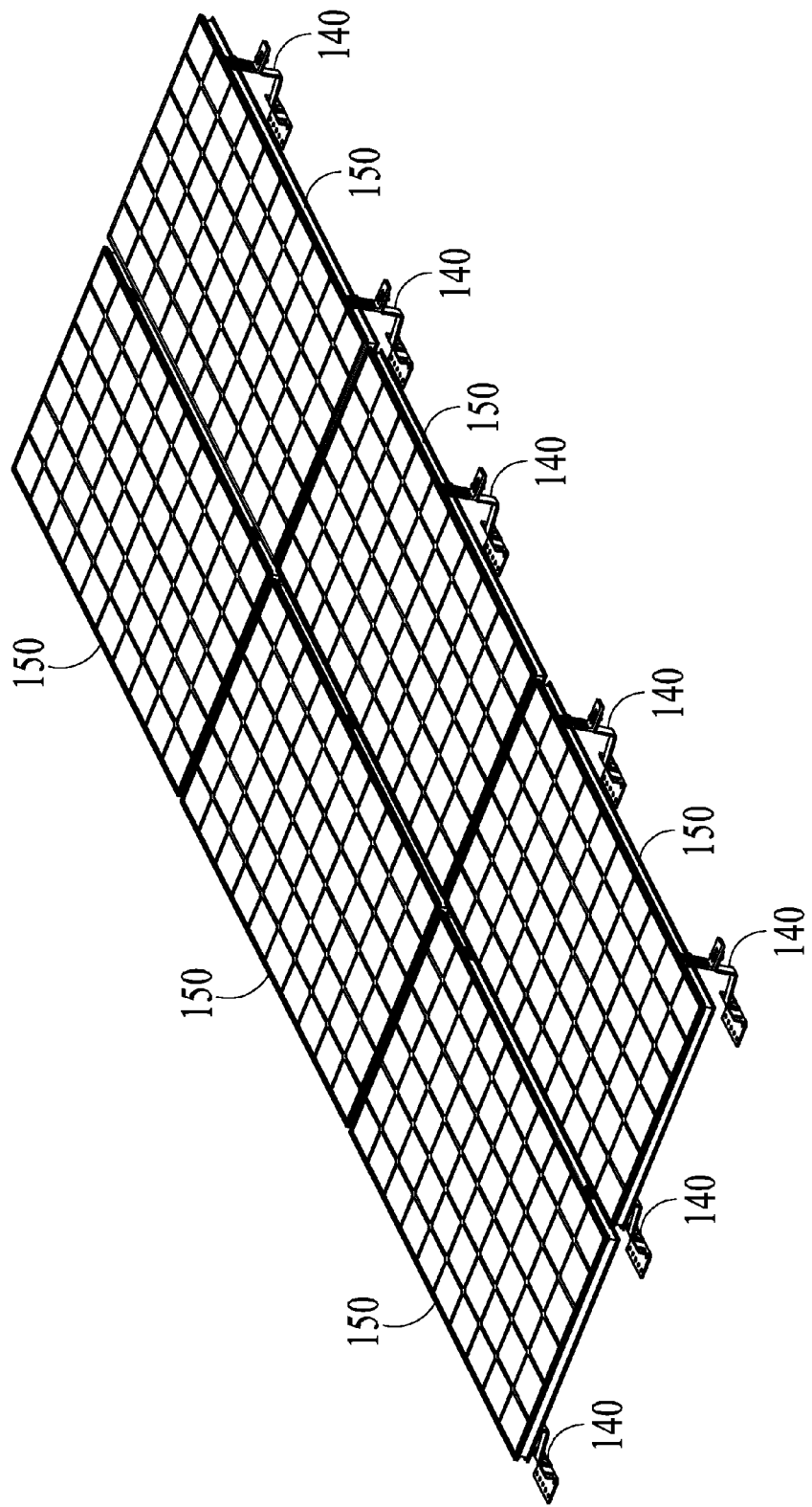
FIG. 41 and FIG. 42 show various views of an assembled rail-less solar mounting system with interlocking solar module connectors and tile foot roof attachment, in accordance with an implementation.
Figure 42:
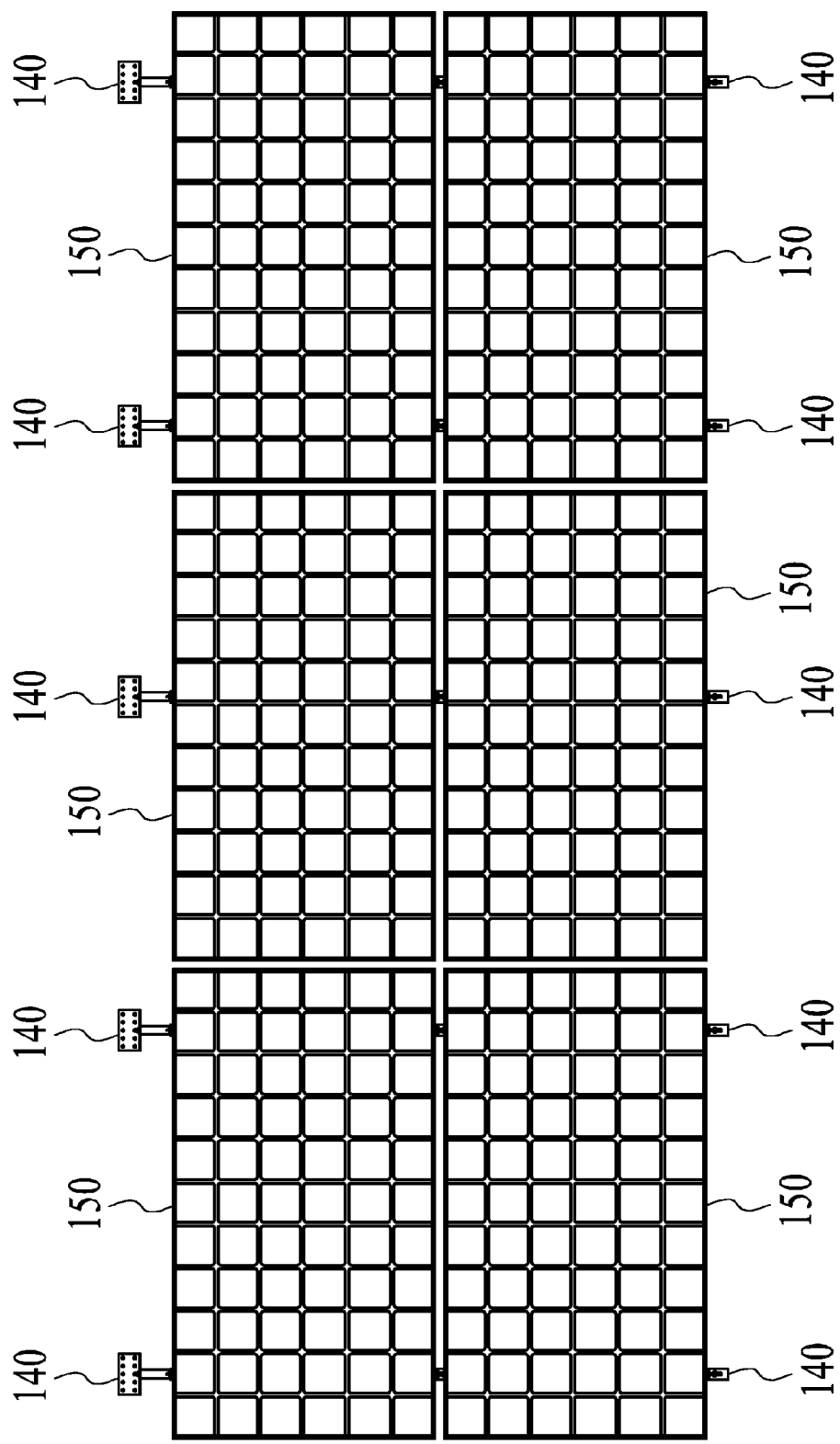

FIG. 41 and FIG. 42 show various views of an assembled rail-less solar mounting system. Solar modules 150 are secured to each other using interlocking solar module connectors 20. The solar modules 150 are attached to the roof using tile foot roof attachments 140 or using other attachments suitable to the roof type. This rail-less solar mounting simplifies solar module installation with a reduced number of mounting components resulting in a reduction in installation time and cost.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope, which is set forth in the following claims.

What is claimed is:

1. A solar module system comprising:
   a first solar module that includes a first solar module frame with a frame slot;
   a second solar module that includes a second solar module frame with a frame slot; and
   a solar module connector that connects the first solar module to the second solar module, the solar module connector including:
   a solar module connector top part that includes a slot insert that fits within the frame slot of the first solar module frame and that includes a top part connection surface,
   a solar module connector bottom part that includes a slot insert that fits within the frame slot of the second solar module frame and that includes a bottom part connection surface, and
   a fastener that securely fastens the solar module connector top part to the solar module connector bottom part so that the top part connection surface exerts a pressure on the second solar module frame to create an electrical connection between the solar module connector and the second solar module frame, and so that the bottom part connection surface exerts a pressure on the first solar module frame to create an electrical connection between the solar module connector and the first solar module frame.

2. The solar module system as in claim 1 wherein the fastener is a bolt that goes through a slot in the solar module connector top part into a threaded hole within the solar module connector bottom part.

3. The solar module system as in claim 1: wherein the solar module connector top part includes a first angled guide; wherein the solar module connector bottom part includes a second angled guide; and, wherein as the fastener securely fastens the solar module connector top part to the solar module connector bottom part, the first angled guide and the second angled guide provide horizontal movement that structurally locks the first solar module to the second solar module, wherein there is horizontal movement of the solar module connector top part with respect to the solar module connector bottom part so that resulting horizontal pressure of the top part connection surface against the second solar module frame is to create the electrical connection between the solar module connector and the second solar module frame and so that resulting horizontal pressure of the bottom part connection surface against the first solar module frame is to create the electrical connection between the solar module connector and the first solar module frame.

4. The solar module system as in claim 1 wherein the top part connection surface includes bonding teeth and wherein the bottom part connection surface includes bonding teeth.

5. The solar module system as in claim 1: wherein the solar module connector top part includes a first flange on which is located the top part connection surface; wherein the solar module connector bottom part includes a second flange on which is located the bottom part connection surface; and, wherein as the fastener securely fastens the solar module connector top part to the solar module connector bottom part, the fastener provides vertical movement of the solar module connector top part with respect to the solar module connector bottom part so that resulting vertical pressure of the top connection surface against the second solar module frame is to create the electrical connection between the solar module connector and the second solar module frame and so that resulting vertical pressure of the bottom part connection surface against the first solar module frame is to create the electrical connection between the solar module connector and the first solar module frame.

6. The solar module system as in claim 1 additionally comprising: a foot roof attachment that includes: an L-bracket, the L-bracket having a vertical slot and a horizontal slot, a bolt with a head shaped to fit within the frame slot of the first solar module frame and a threaded portion shaped to fit through the vertical slot of the L-bracket, a foot base that attaches to a roof, and a foot arm that attaches the foot base to the L-bracket, wherein the vertical slot allows adjustment in a vertical direction and the horizontal slot allows adjustment in a horizontal direction when mounting the first solar module on the roof.

7. The solar module system as in claim 1 additionally comprising: a foot roof attachment that includes: a bracket, the bracket having a vertical slot and a horizontal slot, a bolt with a head shaped to fit within the frame slot of the first solar module frame and a threaded portion shaped to fit through the vertical slot of the bracket, a foot base that attaches to a roof, and a foot arm that attaches the foot base to the bracket, wherein the vertical slot allows adjustment in a vertical direction and the horizontal slot allows adjustment in a horizontal direction when mounting the first solar module on the roof.

8. The solar module system as in claim 1 additionally comprising: a foot roof attachment that includes: an L-bracket, the L-bracket having a vertical slot and a horizontal slot, a bolt with a head shaped to fit within the frame slot of the first solar module frame and a threaded portion shaped to fit through the vertical slot of the L-bracket, a foot base that attaches to a roof, a foot arm that attaches the foot base to the L-bracket, wherein the vertical slot allows adjustment in a vertical direction and the horizontal slot allows adjustment in a horizontal direction when mounting the first solar module on the roof, and a foot flashing placed over the foot base when the foot base is attached to the roof.

9. The solar module system as in claim 1 additionally comprising: a foot roof attachment that includes: an L-bracket, the L-bracket having a vertical slot, a bolt with a head shaped to fit within the frame slot of the first solar module frame and a threaded portion shaped to fit through the vertical slot of the L-bracket, a first foot base that attaches to a roof, a second foot base that attaches to the roof, a first foot arm that attaches to the first foot base, a second foot arm that attaches to the second foot base, and a bridge that is attached to the first foot arm, the second foot arm and the L-bracket, wherein the vertical slot allows adjustment in a vertical direction and the location of placement of the L-bracket on the bridge allows adjustment in a horizontal direction when mounting the first solar module on the roof.

10. The solar module system as in claim 1 additionally comprising: a foot roof attachment that includes: an L-bracket, the L-bracket having a vertical slot, a bolt with a head shaped to fit within the frame slot of the first solar module frame and a threaded portion shaped to fit through the vertical slot of the L-bracket, a first foot base that attaches to a roof, a second foot base that attaches to the roof, a first foot arm that attaches to the first foot base, a second foot arm that attaches to the second foot base, and a bridge that is attached to the first foot arm, the second foot arm and the L-bracket, wherein the vertical slot allows adjustment in a vertical direction and the location of placement of the L-bracket on the bridge allows adjustment in a horizontal direction when mounting the first solar module on the roof; a first foot flashing placed over the first foot base when the first foot base is attached to the roof; and, a second foot flashing placed over the second foot base when the second foot base is attached to the roof.

11. The solar module system as in claim 1 wherein the top part connection surface includes a bonding pin and wherein the bottom part connection surface includes a bonding pin.

12. A solar module connector that connects a first solar module to a second solar module, the solar module connector including:
    a solar module connector top part that includes a slot insert that fits within a frame slot of a first solar module frame of the first solar module, the solar module connector top part including a connection surface, wherein the solar module connector top part includes a first flange on which is located the top part connection surface;
    a solar module connector bottom part that includes a slot insert that fits within a frame slot of a second solar module frame of the second solar module, the solar module connector bottom including a bottom part connection surface, wherein the solar module connector bottom part includes a second flange on which is located the bottom part connection surface; and,
    a fastener that securely fastens the solar module connector top part to the solar module connector bottom part.

13. A foot roof attachment that attaches a solar module to a roof, the foot roof attachment comprising:
    an L-bracket, the L-bracket having a vertical slot;
    a bolt with a head shaped to fit within a frame slot of a solar module frame of the solar module and the bolt having a threaded portion shaped to fit through the vertical slot of the L-bracket,
    a first foot base that attaches to a roof;
    a second foot base that attaches to the roof;
    a first foot arm that attaches to the first foot base;
    a second foot arm that attaches to the second foot base; and
    a bridge that is attached to the first foot arm, the second foot arm and the L-bracket.

14. The foot roof attachment as in claim 13, wherein a first foot flashing is placed over the first foot base when the first foot base is attached to the roof, and wherein a second foot flashing is placed over the second foot base when the second foot base is attached to the roof.

15. The foot roof attachment as in claim 13, wherein the bolt is a T-bolt that includes sharp edges.

* * * * *